(12) United States Patent
Lee et al.

(10) Patent No.: US 10,397,938 B2
(45) Date of Patent: Aug. 27, 2019

(54) METHOD FOR TRANSMISSION AND RECEPTION OF UPLINK DATA IN WIRELESS COMMUNICATION SYSTEM, AND DEVICE THEREFOR

(71) Applicant: LG ELECTRONICS INC., Seoul (KR)

(72) Inventors: Eunjong Lee, Seoul (KR); Joonkui Ahn, Seoul (KR); Heejeong Cho, Seoul (KR); Genebeck Hahn, Seoul (KR); Suckchel Yang, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 15/739,937

(22) PCT Filed: Dec. 2, 2015

(86) PCT No.: PCT/KR2015/013058
§ 371 (c)(1),
(2) Date: Dec. 26, 2017

(87) PCT Pub. No.: WO2016/208829
PCT Pub. Date: Dec. 29, 2016

(65) Prior Publication Data
US 2018/0192434 A1 Jul. 5, 2018

Related U.S. Application Data

(60) Provisional application No. 62/184,915, filed on Jun. 26, 2015.

(51) Int. Cl.
*H04W 72/12* (2009.01)
*H04W 28/02* (2009.01)
(Continued)

(52) U.S. Cl.
CPC ....... *H04W 72/1242* (2013.01); *H04L 5/0064* (2013.01); *H04L 5/0094* (2013.01);
(Continued)

(58) Field of Classification Search
None
See application file for complete search history.

(56) References Cited

U.S. PATENT DOCUMENTS 9,337,981 B2 * 5/2016 Nogami .................. H04L 5/001
9,769,699 B2 * 9/2017 Tseng ..................... H04W 4/70
(Continued)

FOREIGN PATENT DOCUMENTS

KR 20100110265 10/2010

OTHER PUBLICATIONS

PCT International Application No. PCT/KR2015/013058, International Search Report dated Mar. 24, 2016, 2 pages.
(Continued)

*Primary Examiner* — Michael J Moore, Jr.
(74) *Attorney, Agent, or Firm* — Lee Hong Degerman Kang Waimey

(57) ABSTRACT

In the present disclosure, a method for transmitting and receiving uplink (UL) data performed by a base station in a wireless communication system includes transmitting a UL grant to a first user equipment (UE); transmitting a fast UL grant in relation to an urgent message transmission to at least one of the first UE or a second UE; and receiving the urgent message from the second UE through a UL resource allocated by the fast UL grant, and the UL resource allocated by the fast UL grant is a resource withdrawn from a resource allocated to the first UE by the UL grant.

10 Claims, 24 Drawing Sheets

(51) Int. Cl.
  *H04L 5/00* (2006.01)
  *H04W 28/12* (2009.01)
  *H04W 28/26* (2009.01)
  *H04W 72/14* (2009.01)
  *H04W 72/04* (2009.01)

(52) U.S. Cl.
  CPC .......... *H04W 28/02* (2013.01); *H04W 28/12* (2013.01); *H04W 28/26* (2013.01); *H04W 72/04* (2013.01); *H04W 72/14* (2013.01); *H04L 5/0023* (2013.01); *H04L 5/0055* (2013.01); *H04W 28/0278* (2013.01); *H04W 72/1284* (2013.01)

(56) References Cited

U.S. PATENT DOCUMENTS

| | | | | |
|---|---|---|---|---|
| 2010/0202420 A1* | 8/2010 | Jersenius | ............... | H04L 47/10 370/337 |
| 2010/0254329 A1* | 10/2010 | Pan | ............... | H04L 5/001 370/329 |
| 2011/0034145 A1 | 2/2011 | Youn et al. | | |
| 2011/0044192 A1* | 2/2011 | Wang | ............... | H04W 72/1221 370/252 |
| 2011/0055387 A1* | 3/2011 | Tseng | ............... | H04W 72/1221 709/224 |
| 2012/0163313 A1* | 6/2012 | Jung | ............... | H04W 72/048 370/329 |
| 2013/0003678 A1* | 1/2013 | Quan | ............... | H04W 72/04 370/329 |
| 2013/0223394 A1* | 8/2013 | Nishio | ............... | H04L 5/0048 370/329 |
| 2014/0133442 A1 | 5/2014 | Zhao et al. | | |
| 2014/0269352 A1* | 9/2014 | Sun | ............... | H04W 72/1284 370/250 |
| 2016/0057785 A1* | 2/2016 | Zhang | ............... | H04W 74/0833 370/329 |
| 2016/0088624 A1* | 3/2016 | Lee | ............... | H04W 80/02 370/329 |
| 2016/0234714 A1* | 8/2016 | Basu Mallick | ..... | H04W 28/085 |
| 2016/0277951 A1* | 9/2016 | Faronius | ............... | H04L 65/1083 |
| 2016/0345352 A1* | 11/2016 | Langereis | ............... | H04B 1/40 |
| 2017/0318565 A1* | 11/2017 | Golitschek Edler von Elbwart | ............... | H04W 72/042 |
| 2018/0092126 A1* | 3/2018 | Yi | ............... | H04B 7/26 |

OTHER PUBLICATIONS

Huawei, et al., "PUCCH resource allocation", R1-153196, 3GPP TSG RAN WG1 Meeting 81, May 2015, 5 pages.

Catt, "Considerations on PUCCH resource allocation for Rel-13 low complexity UEs and UEs in enhanced coverage", R1-152559, 3GPP TSG RAN WG1 Meeting #81, May 2015, 5 pages.

* cited by examiner

[FIG. 1]
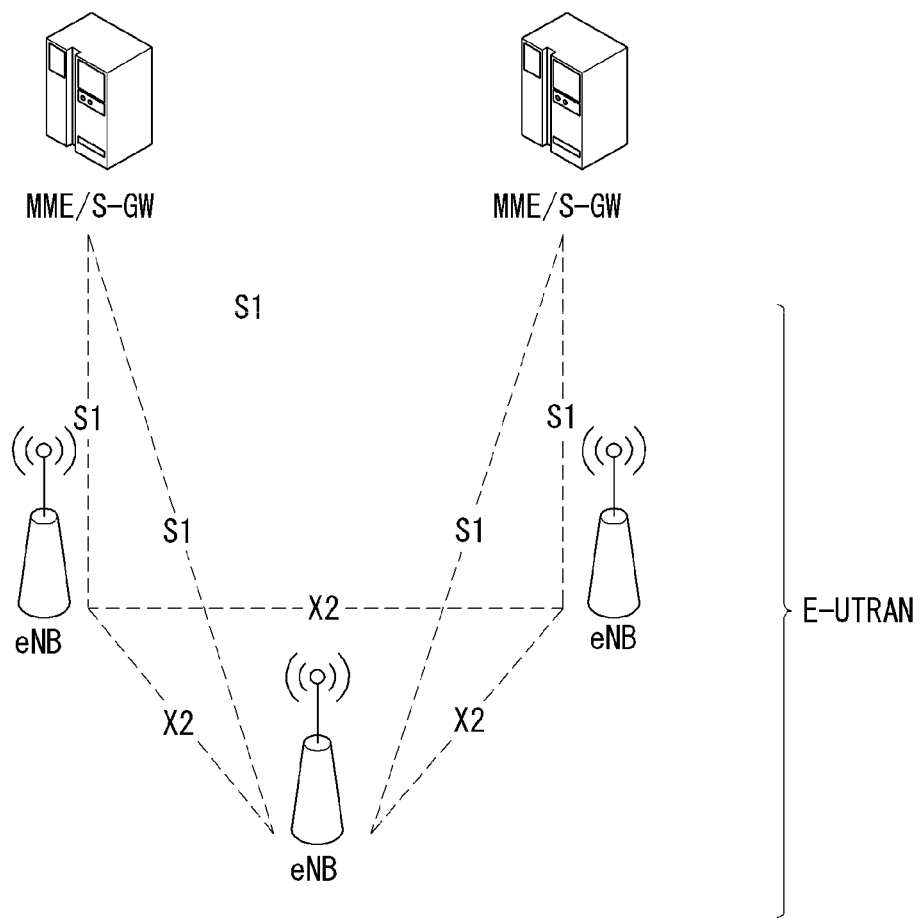

[FIG. 2]
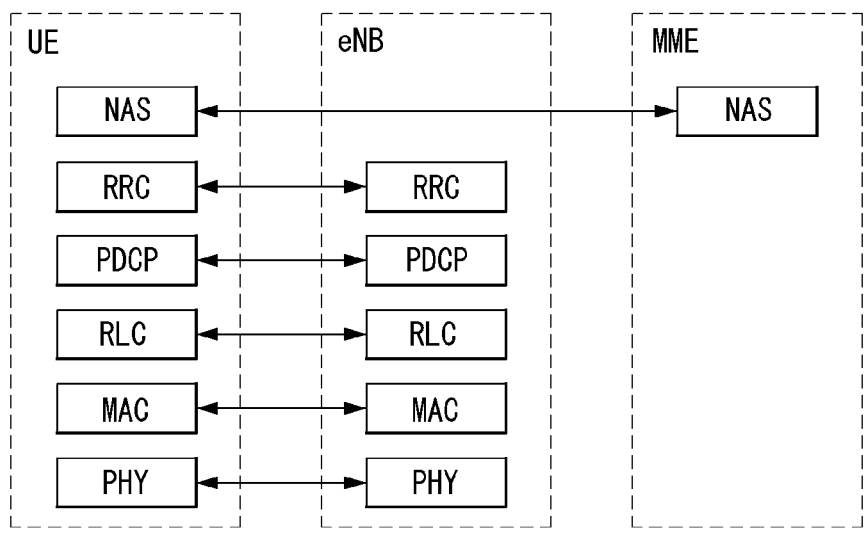
(a) Control plane protocol stack
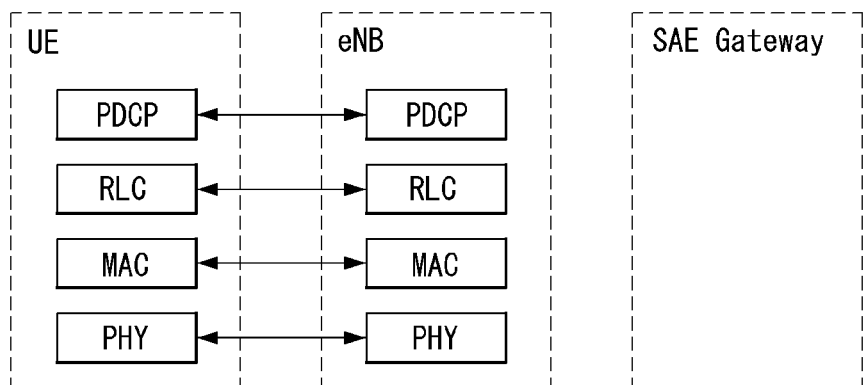
(b) Control plane protocol stack

[FIG. 3]
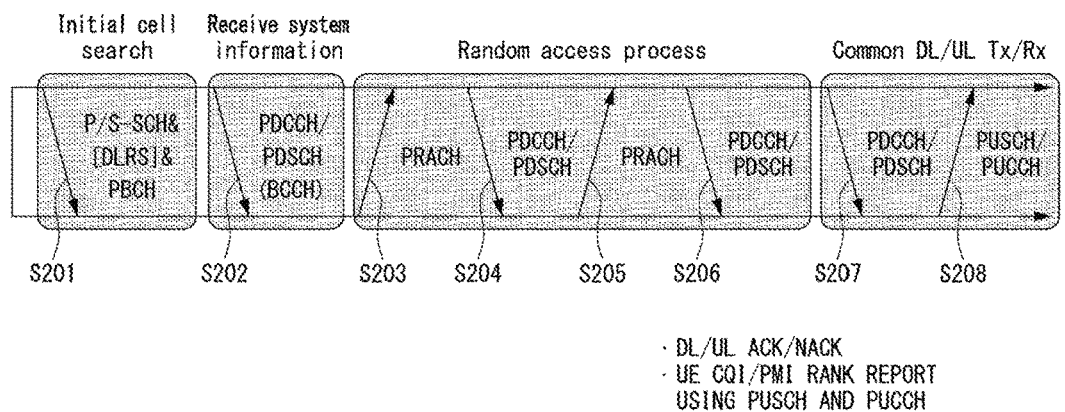
[FIG. 4]
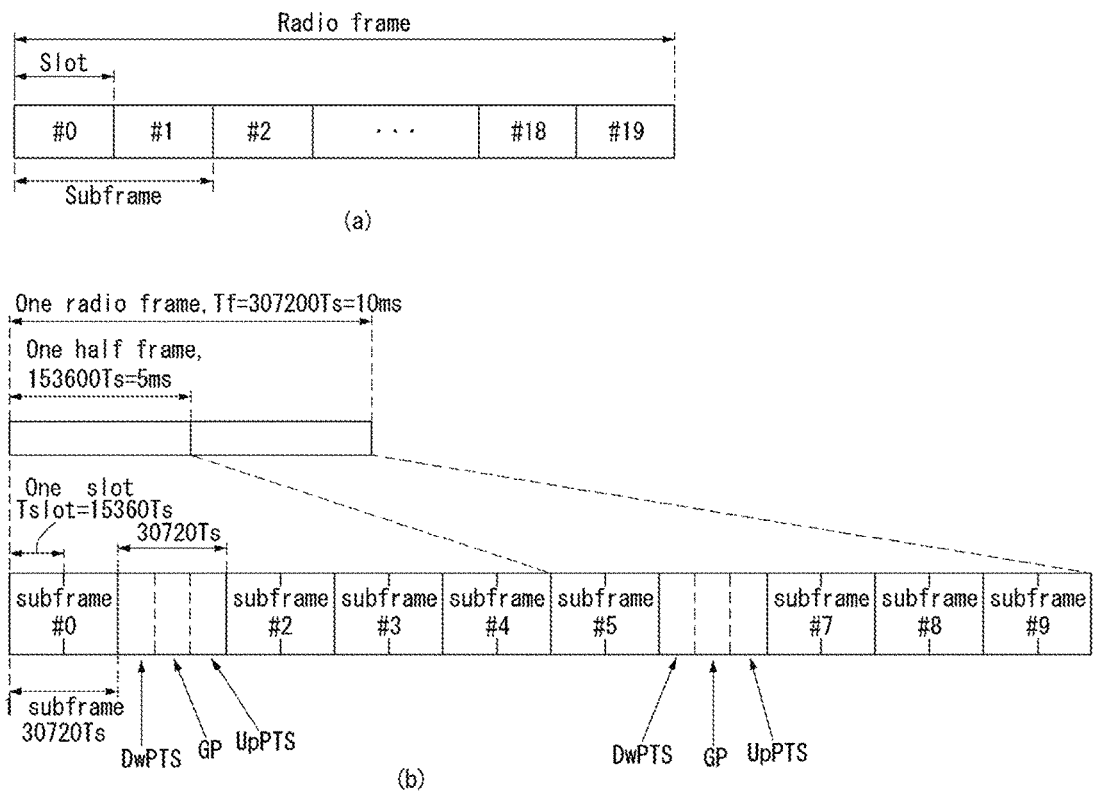

[FIG. 5]
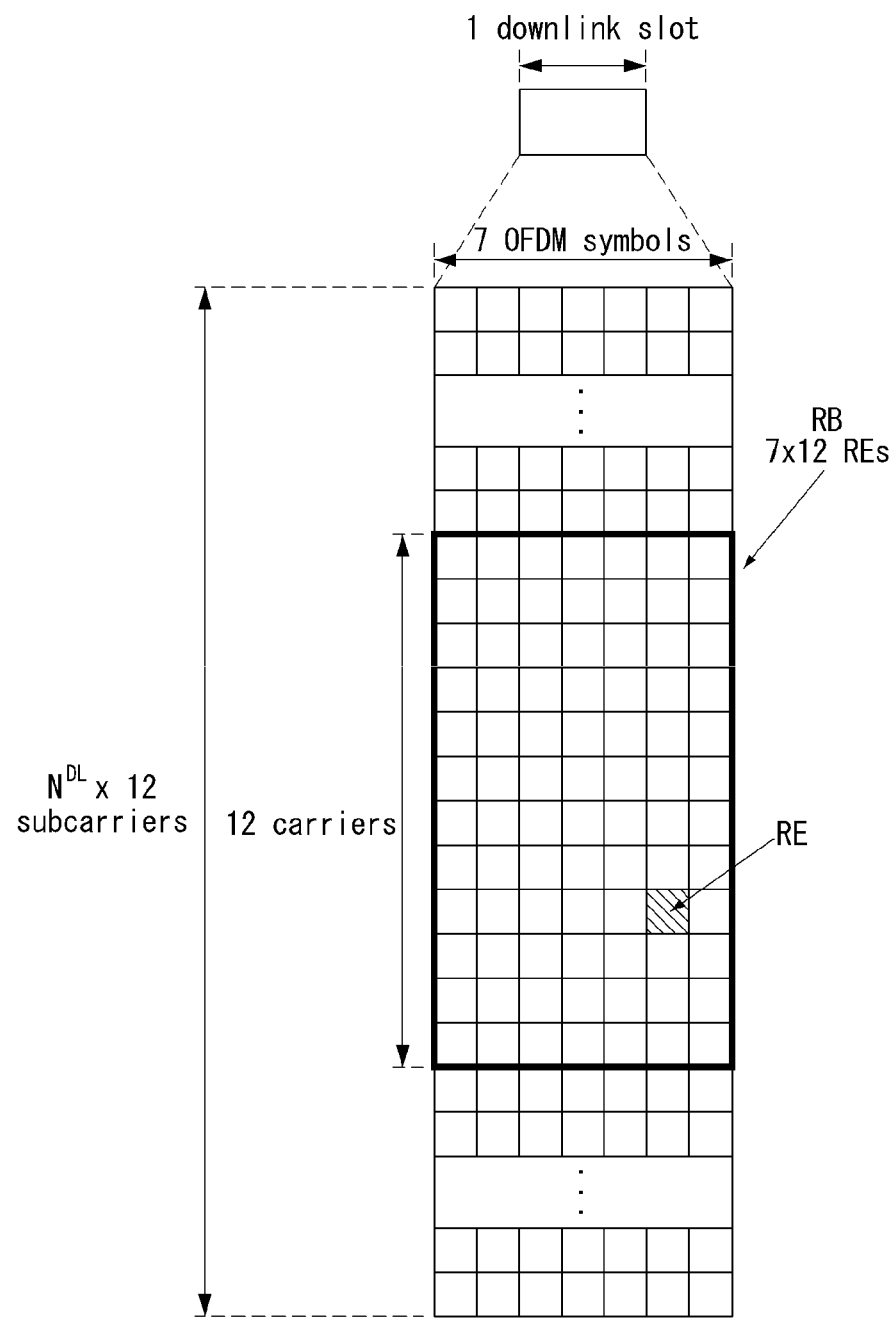

[FIG. 6]
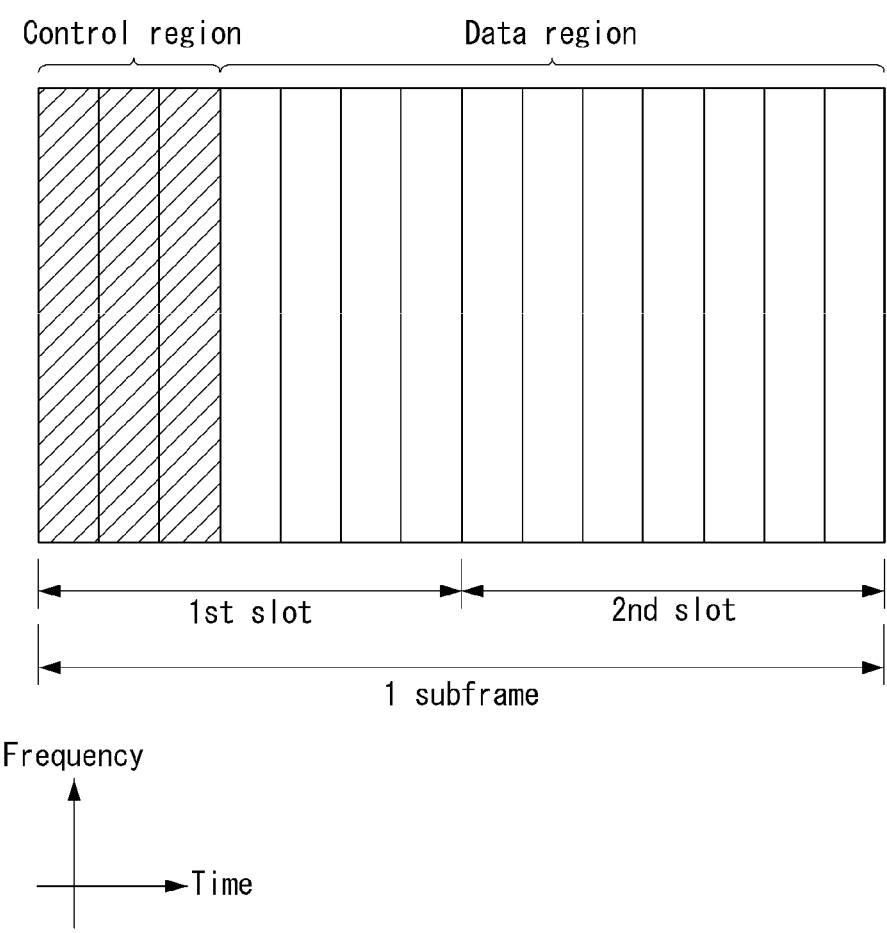

[FIG. 7]
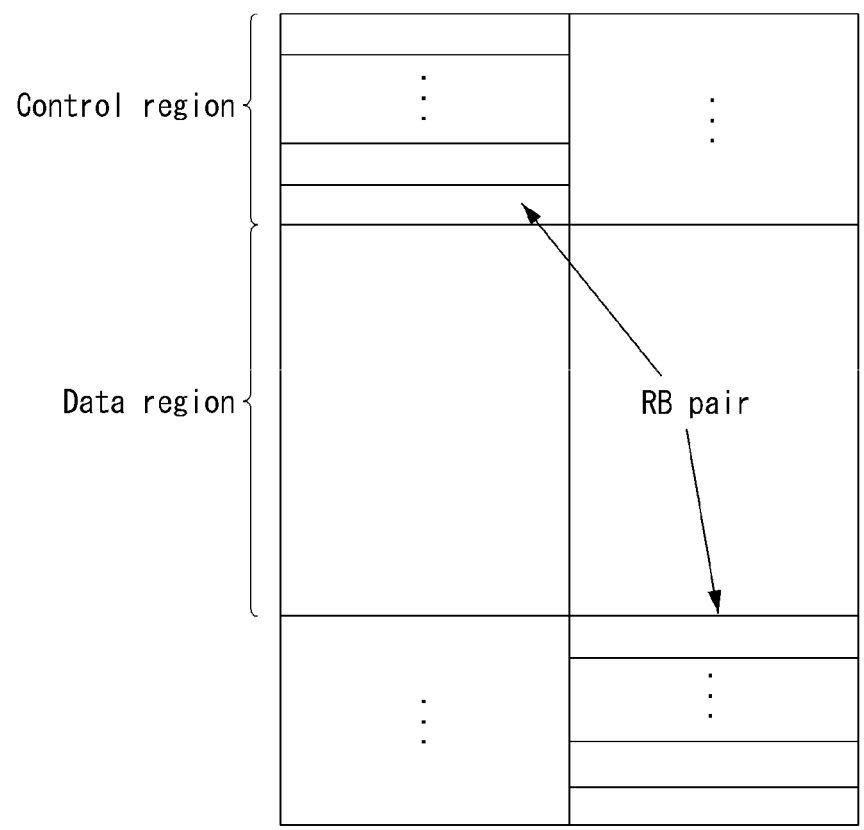

【FIG. 8】
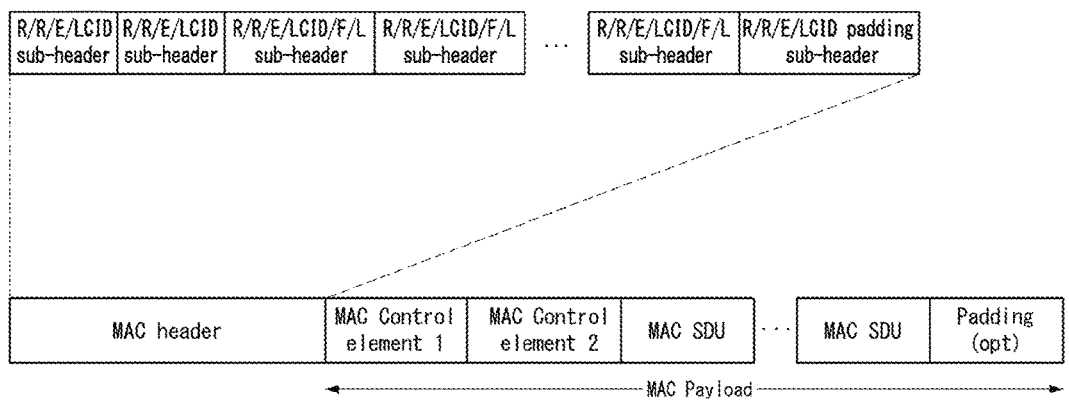
【FIG. 9】
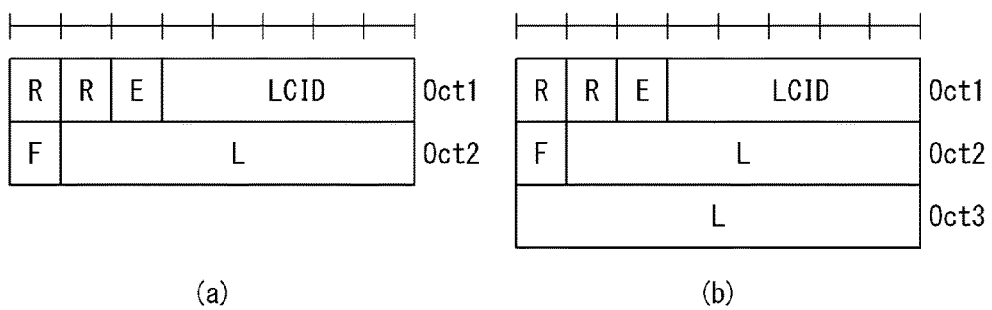
【FIG. 10】
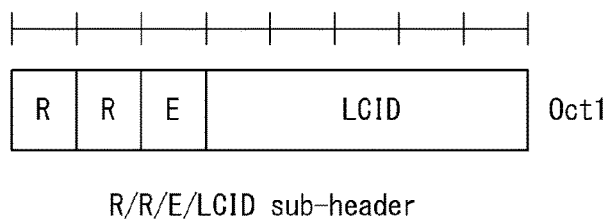
R/R/E/LCID sub-header 【FIG. 11】
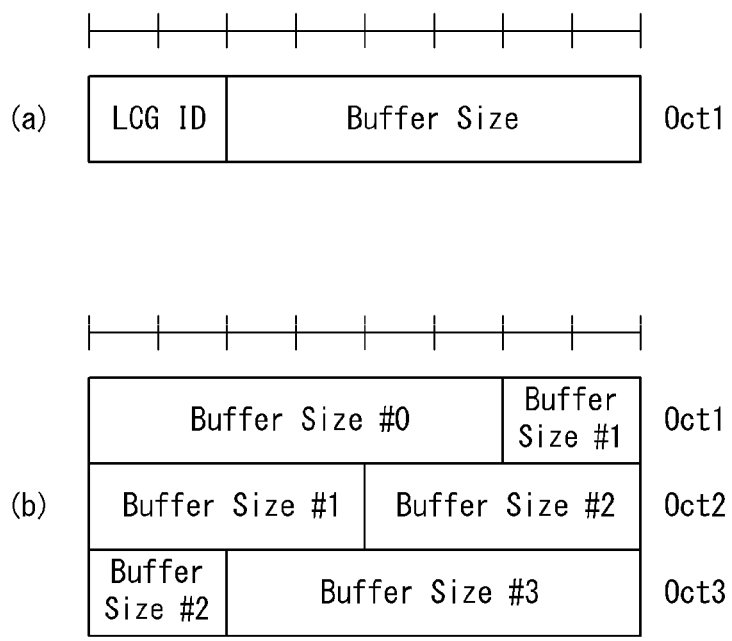

[FIG. 12]
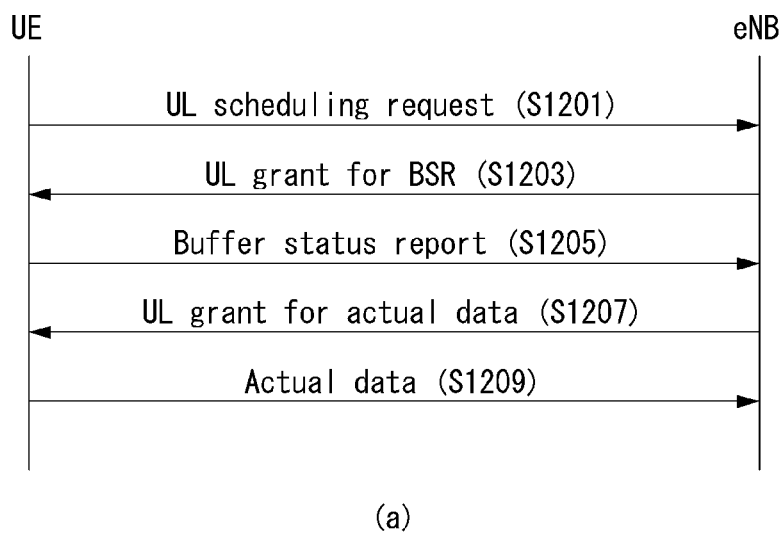
(a)
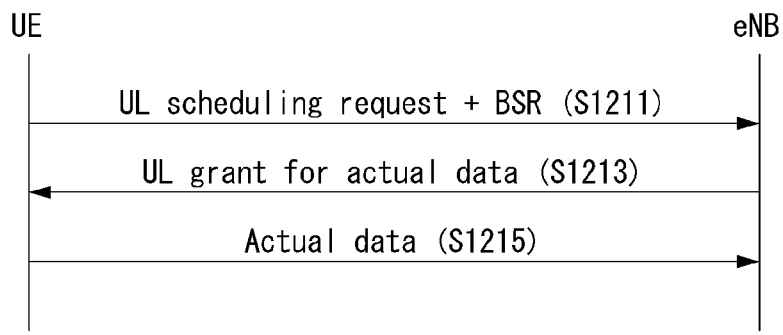
(b)

[FIG. 13]
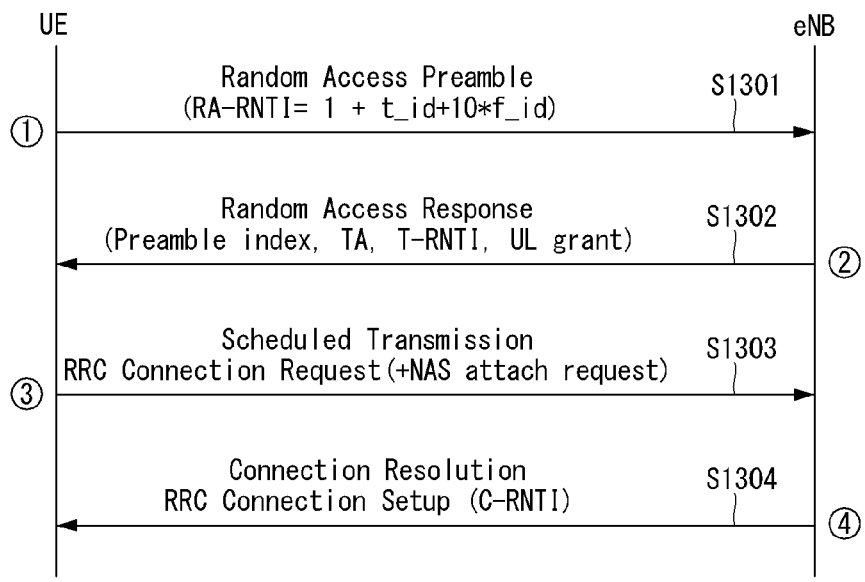
(a)
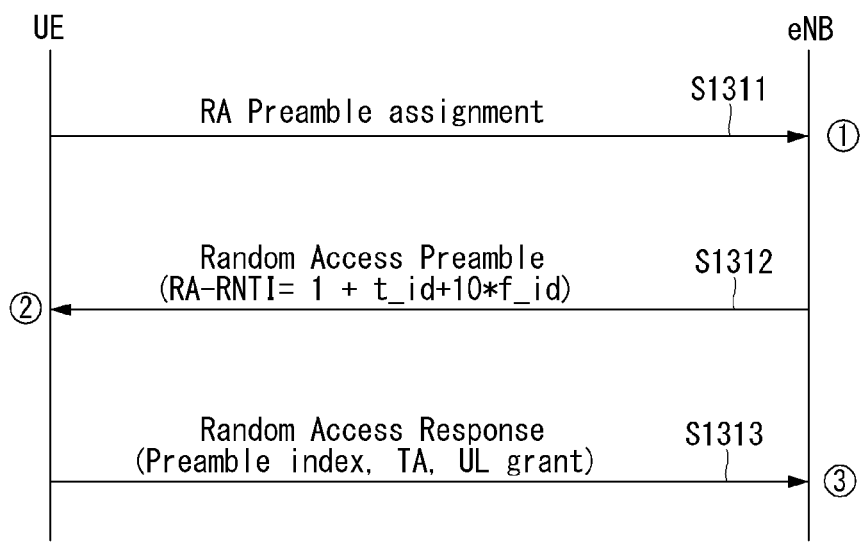
(b)

[FIG. 14]
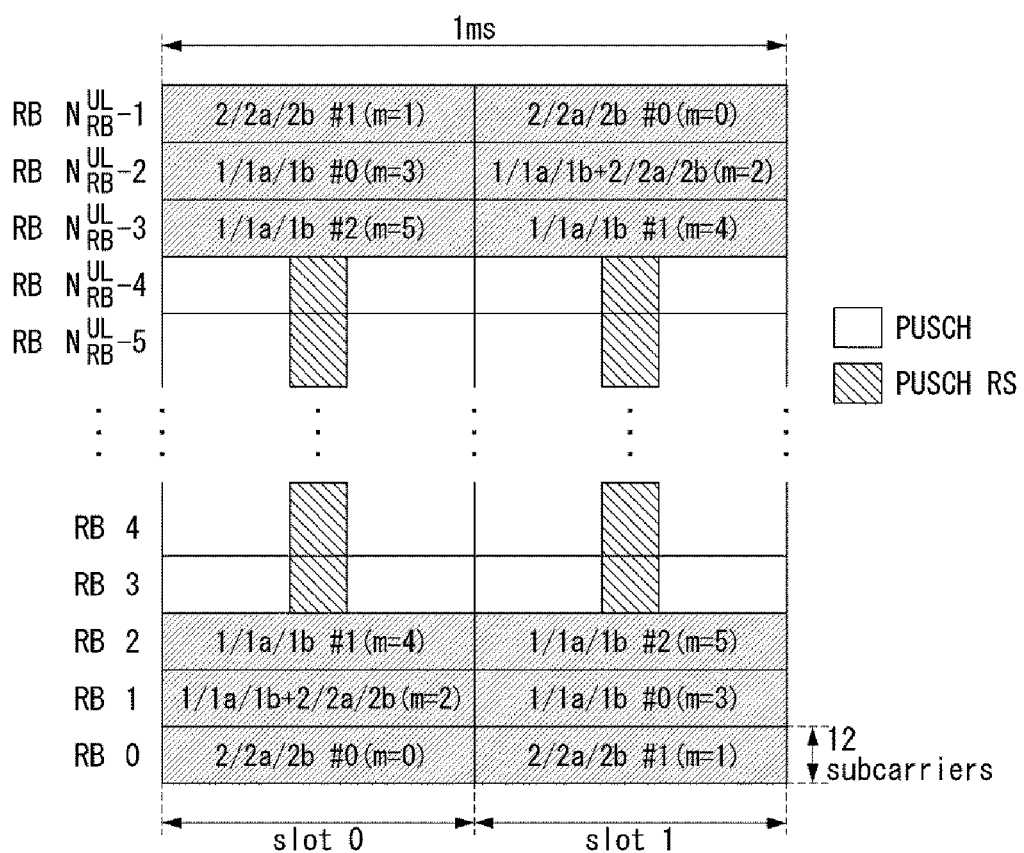

[FIG. 15]
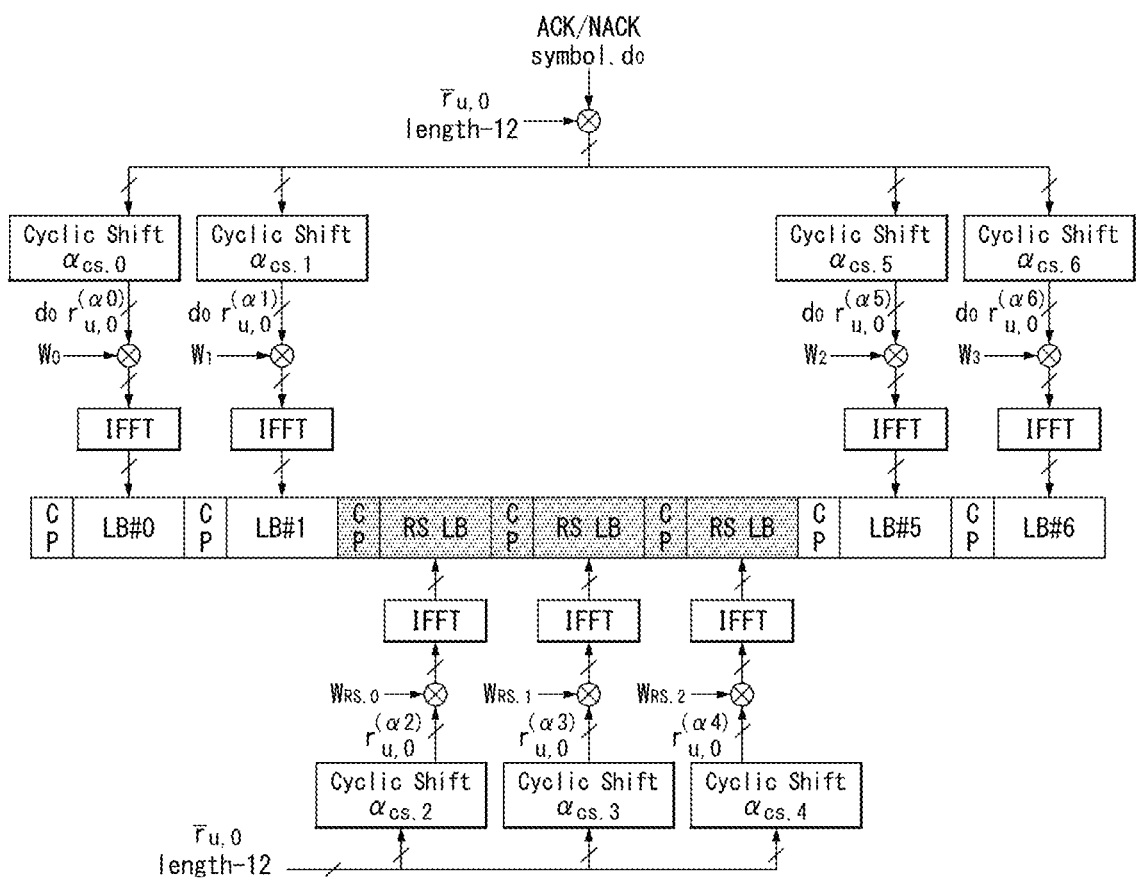

[FIG. 16]
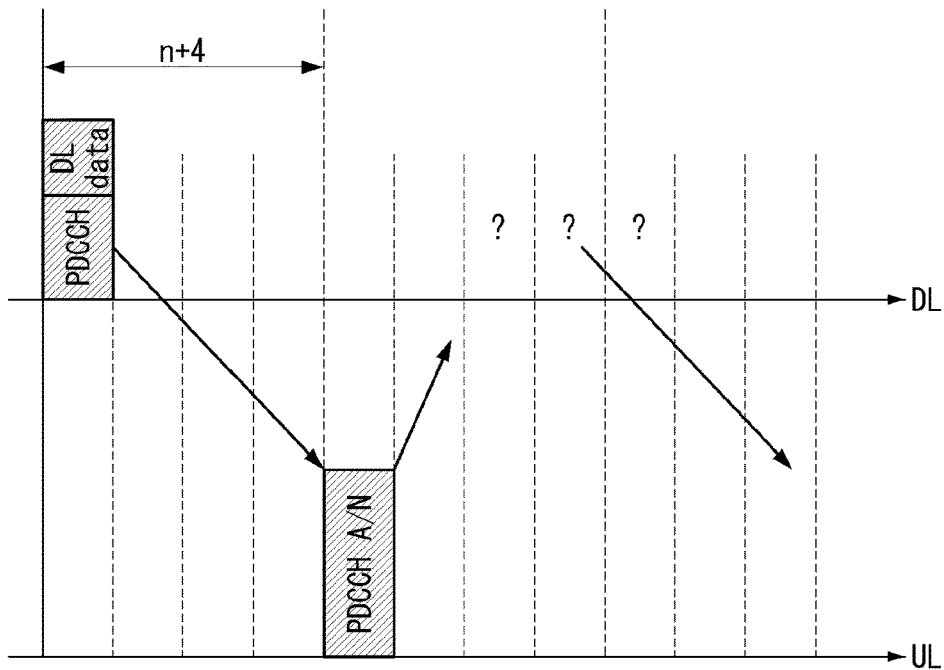
[FIG. 17]
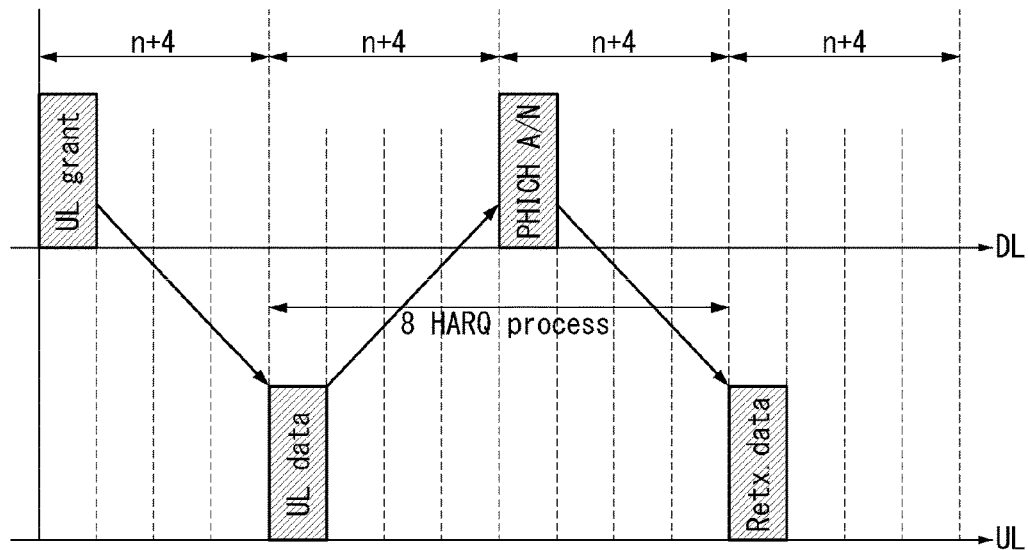
[FIG. 18]
| 0/1A | FH | RESOURCE BLOCK ALLOCATION | MCS/RV (5) | NDI | TPC (2) | DMRS CS (3) | UI (2) | DAI (2) | CQI req. |
|---|---|---|---|---|---|---|---|---|---|

[FIG. 19]
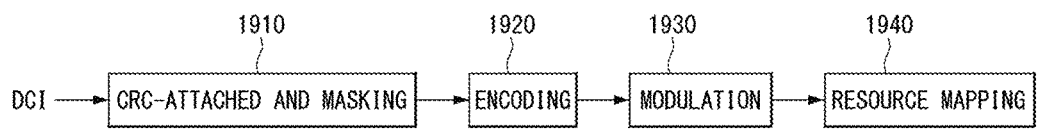
[FIG. 20]
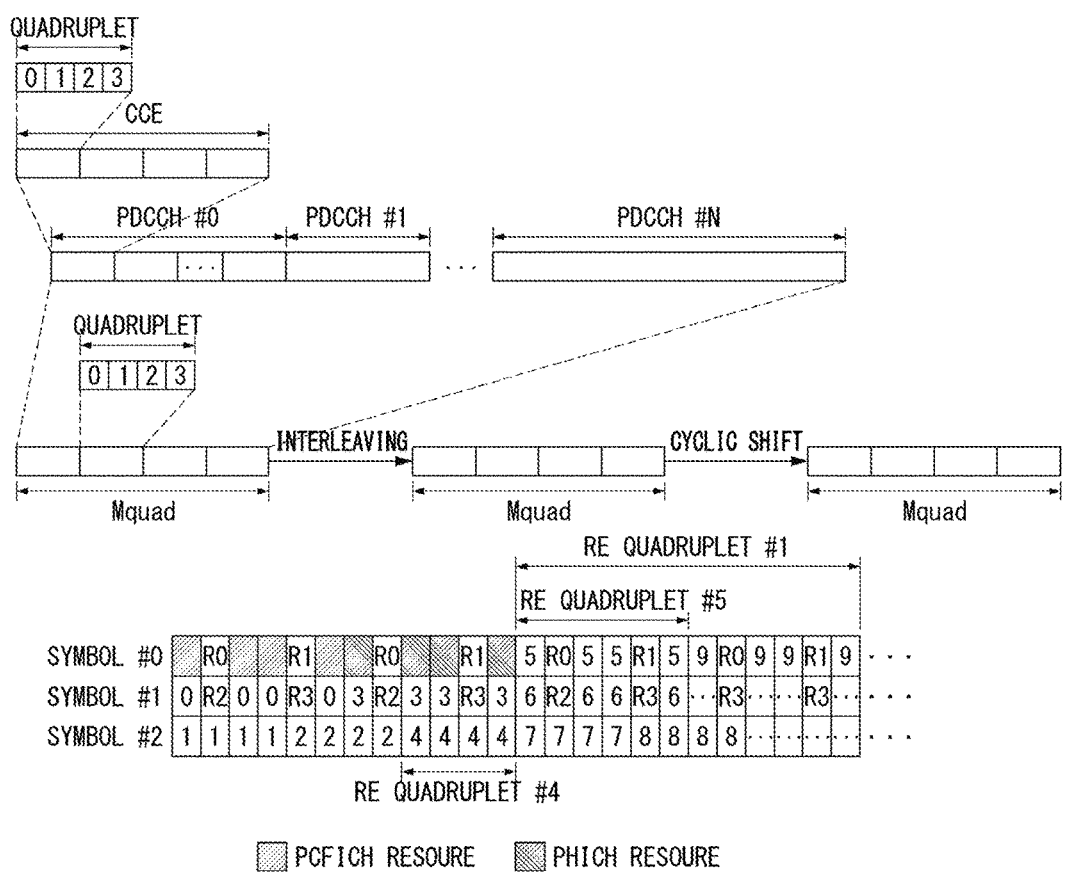

【FIG. 21】
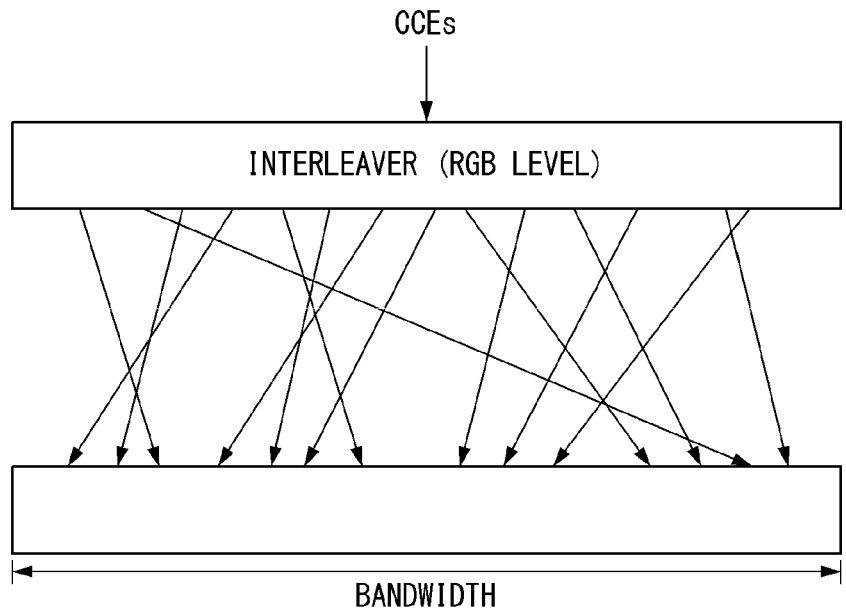
【FIG. 22】
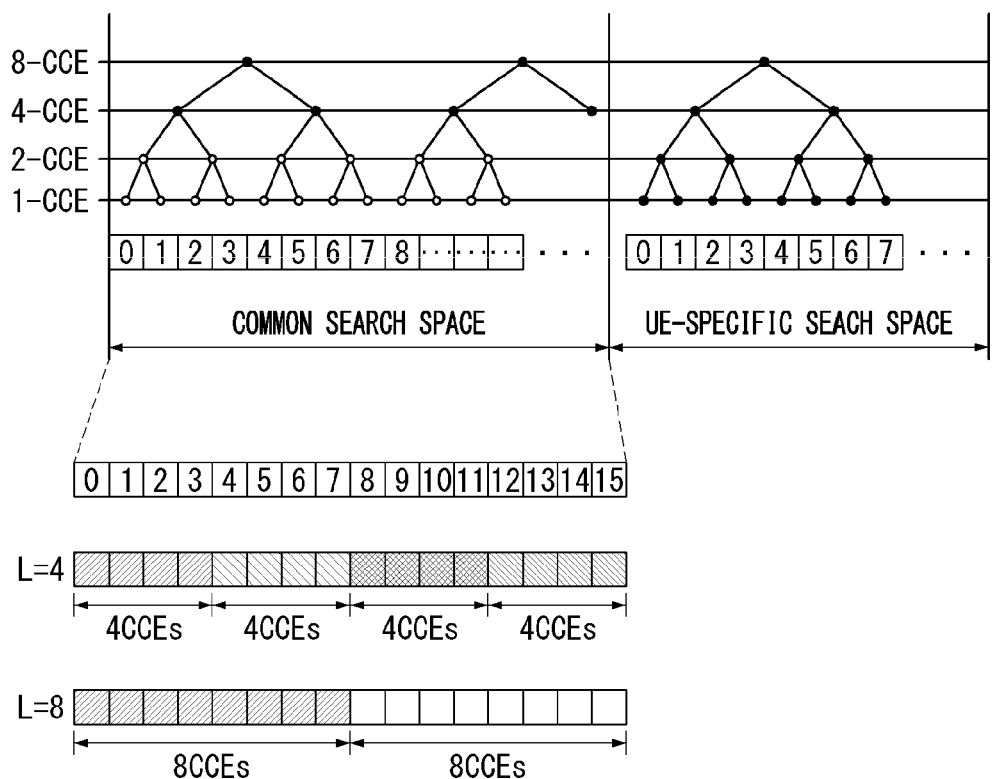

[FIG. 23]
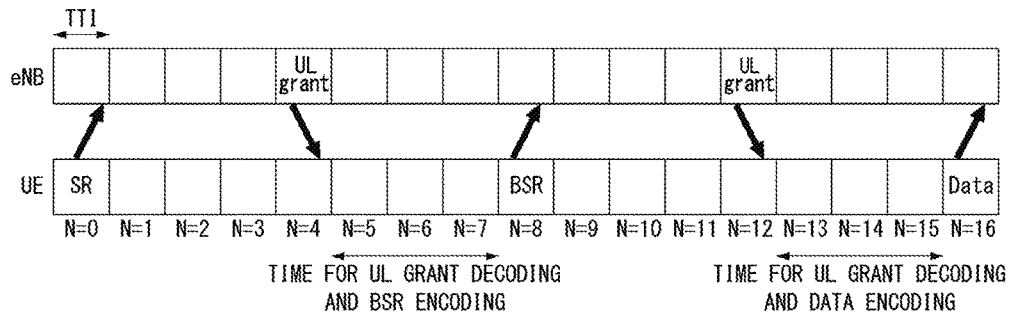
[FIG. 24]
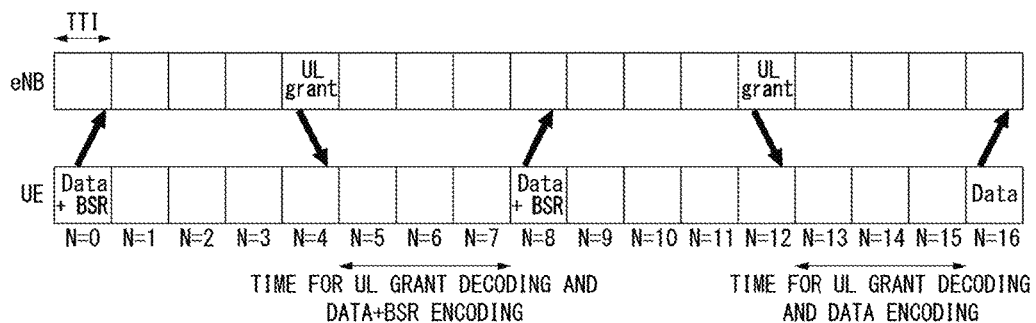
[FIG. 25]
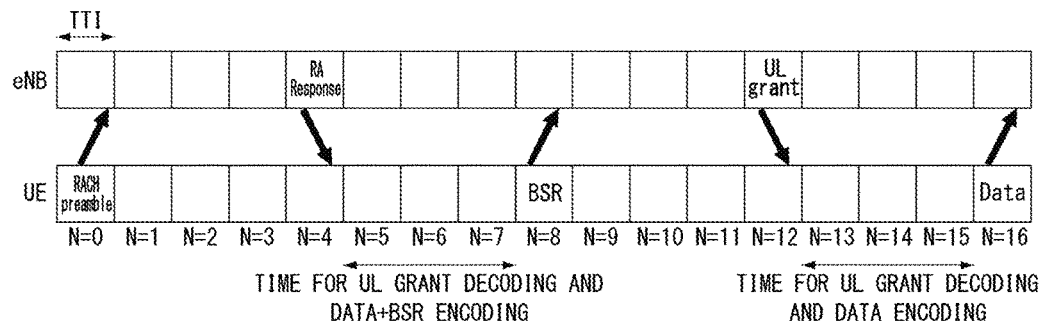

【FIG. 26】
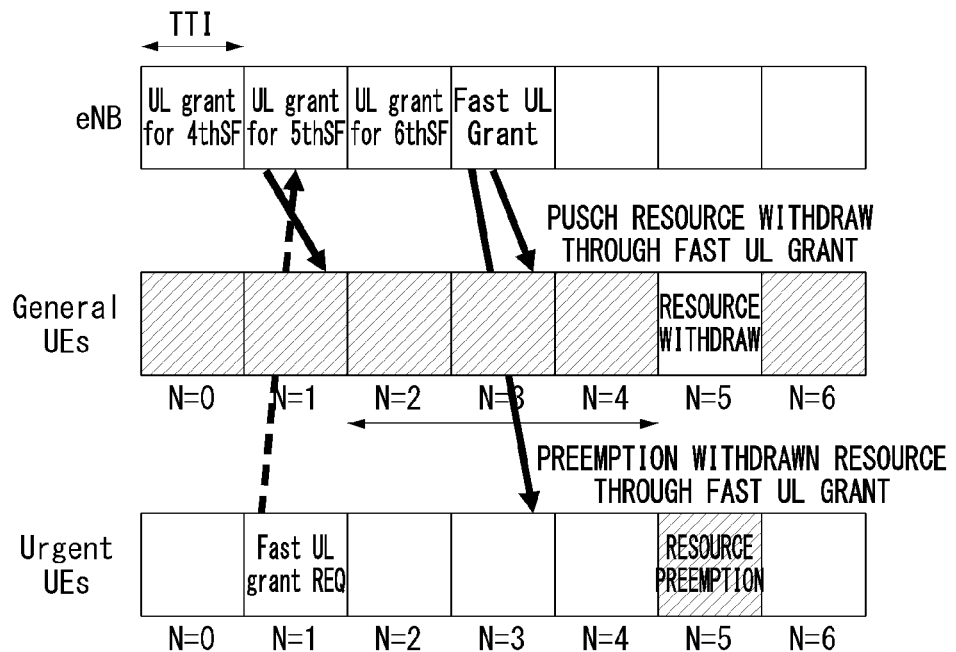
【FIG. 27】
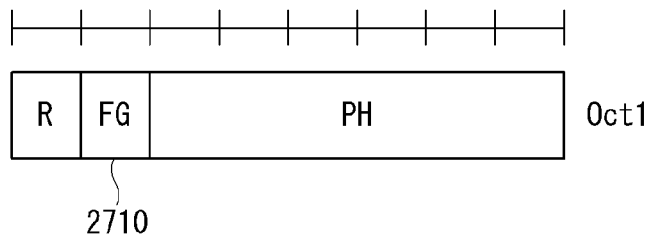
【FIG. 28】
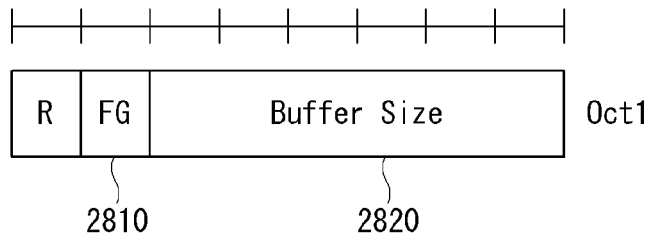

[FIG. 29]
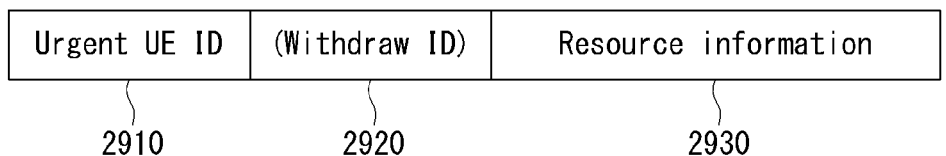
[FIG. 30]
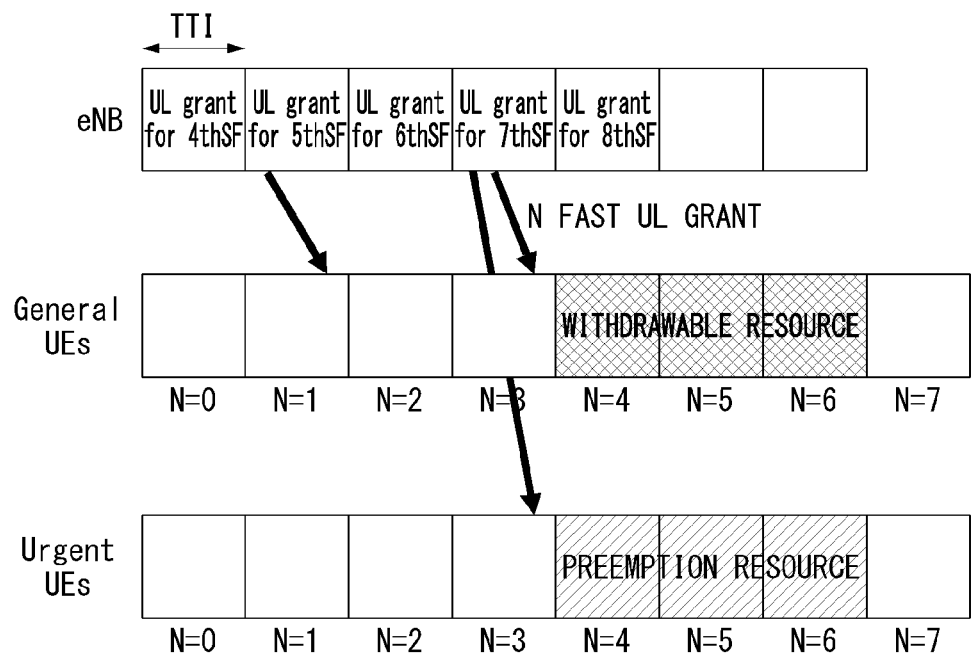
[FIG. 31]
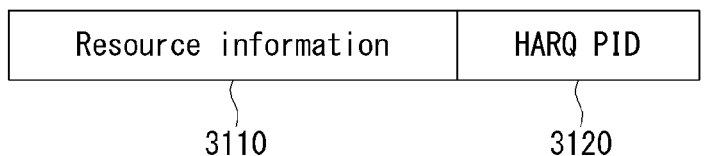

[FIG. 32]
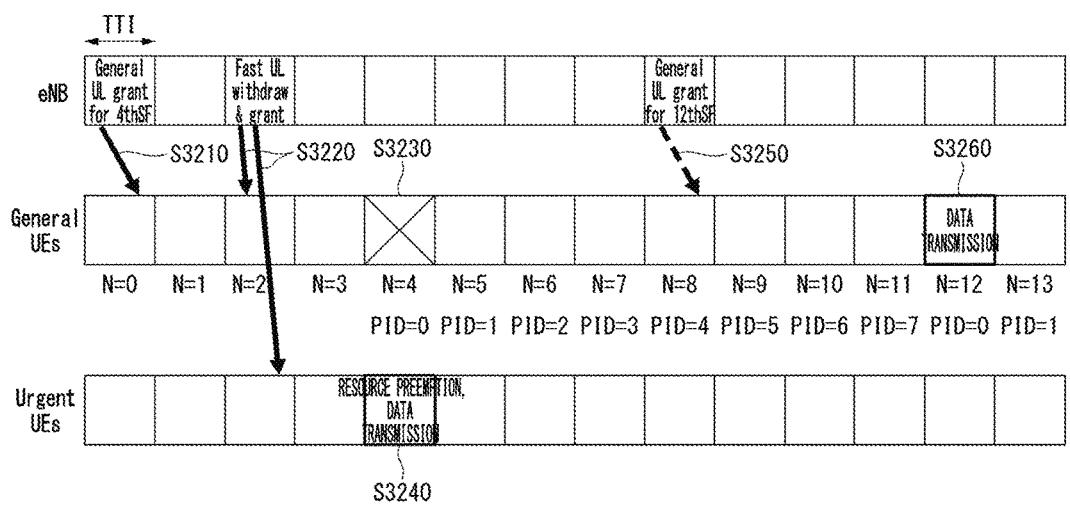
[FIG. 33]
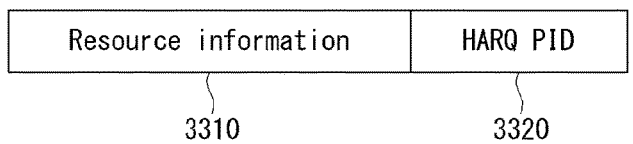

[FIG. 34]
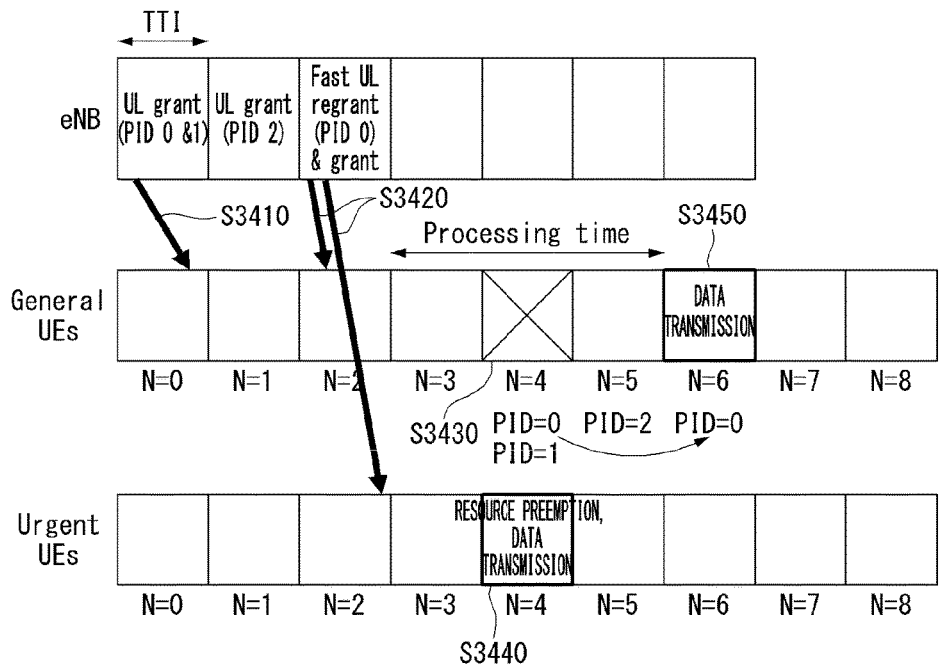
[FIG. 35]
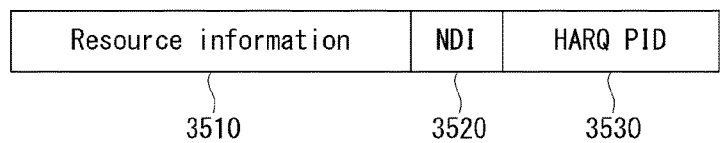
[FIG. 36]
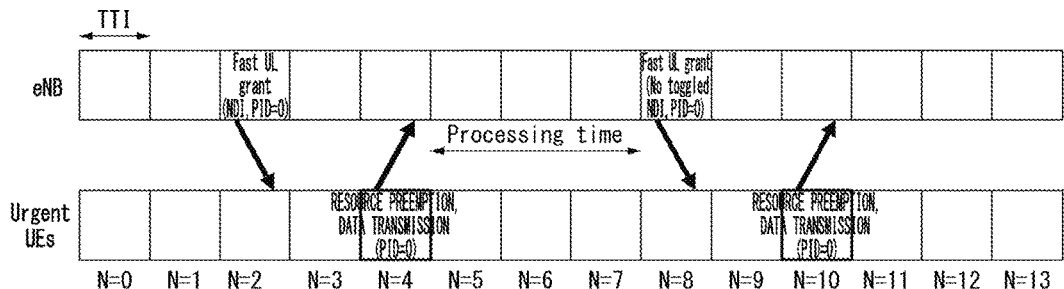

[FIG. 37]
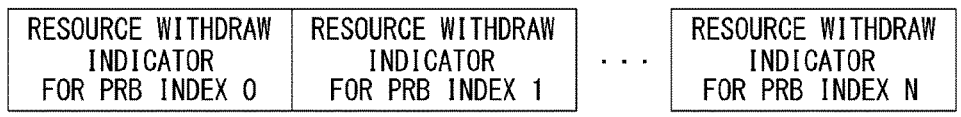
(a) RESOURCE WITHDRAW INDICATOR FOR PRB INDEX UNIT
(b) RESOURCE WITHDRAW INDICATOR FOR RBG INDEX UNIT
[FIG. 38]
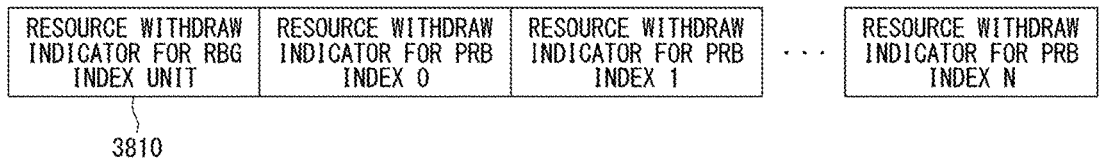

【FIG. 39】
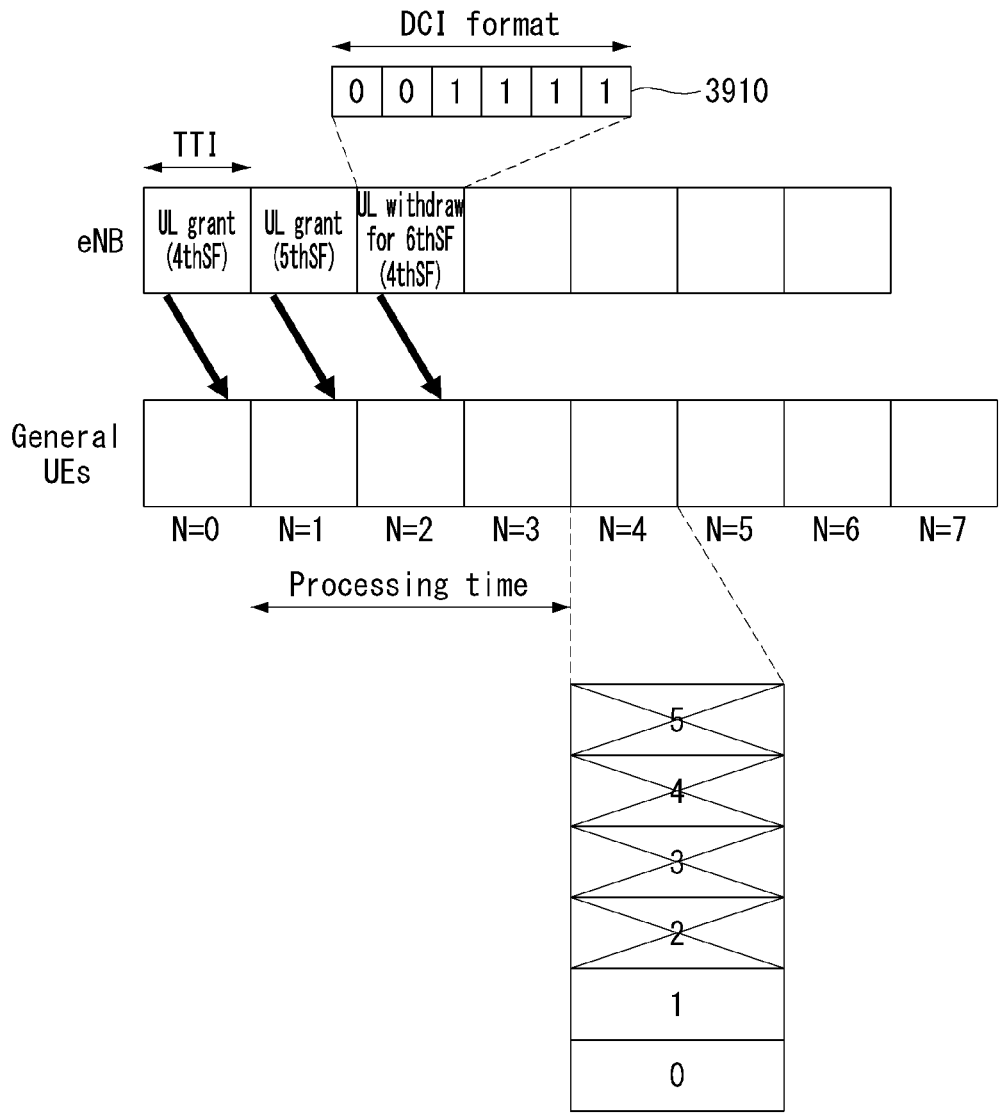
【FIG. 40】

[FIG. 41]
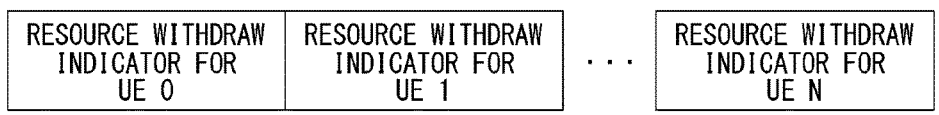
[FIG. 42]
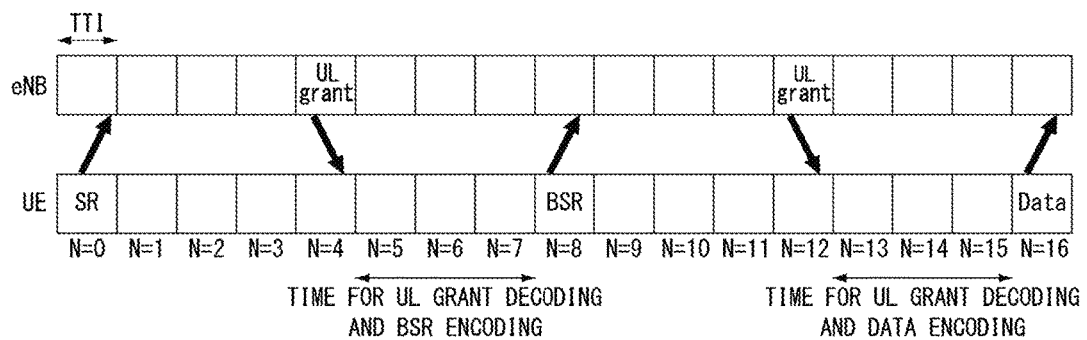
[FIG. 43]
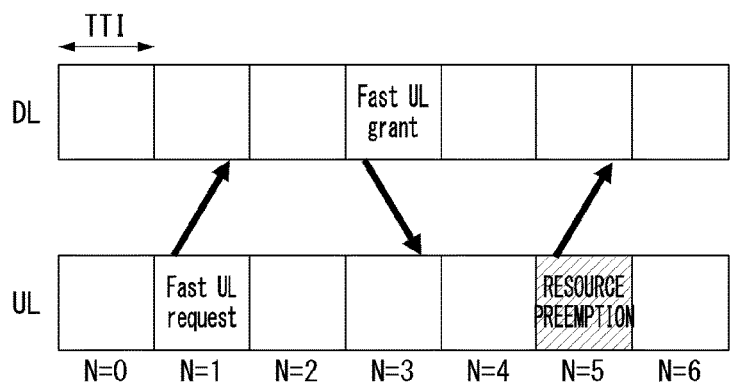

[FIG. 44]
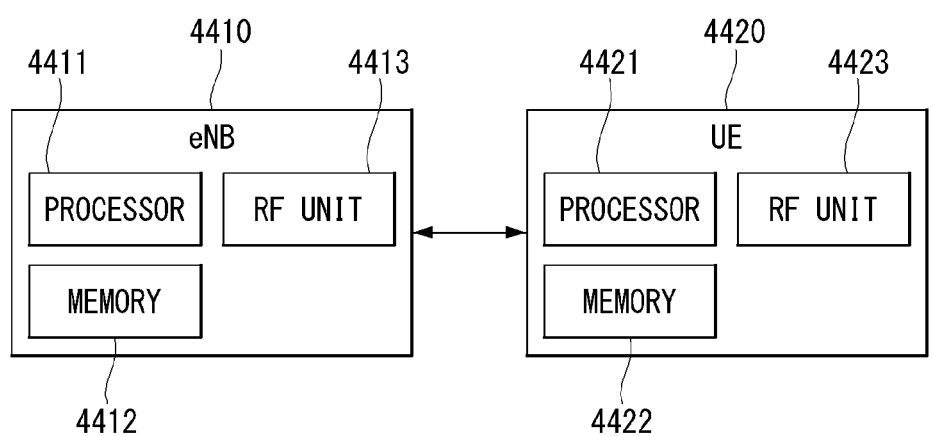

METHOD FOR TRANSMISSION AND RECEPTION OF UPLINK DATA IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2015/013058, filed on Dec. 2, 2015, which claims the benefit of U.S. Provisional Application No. 62/184,915, filed on Jun. 26, 2015, the contents of which are all hereby incorporated by reference herein in their entirety.

TECHNICAL FIELD

The present invention relates to wireless communication systems, and more particularly, to a method for fast-retransmitting uplink data in a wireless communication system and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a method for transmitting and receiving a fast UL grant in order to support a new 5G low latency wireless service.

In addition, another object of the present disclosure is to provide a condition for triggering a fast UL grant transmission in a base station.

The technical objects to attain in the present disclosure are not limited to the above-described technical objects and other technical objects which are not described herein will become apparent to those skilled in the art from the following description.

Technical Solution

In the present disclosure, a method for transmitting and receiving uplink (UL) data performed by a base station in a wireless communication system includes transmitting a UL grant to a first user equipment (UE); transmitting a fast UL grant in relation to an urgent message transmission to at least one of the first UE or a second UE; and receiving the urgent message from the second UE through a UL resource allocated by the fast UL grant, and the UL resource allocated by the fast UL grant is a resource withdrawn from a resource allocated to the first UE by the UL grant.

In addition, the present disclosure further includes receiving a fast UL grant request that requests a fast UL resource allocation for the urgent message transmission from the second UE.

In addition, in the present disclosure, the fast UL grant request is an urgent signal (US) transmitted and received through a PUCCH or a scheduling request (SR) defined for an urgent service or a buffer status report (BSR) defined for an urgent service or a specific preamble index transmitted and received through a PRACH.

In addition, in the present disclosure, the fast UL grant request is a field indicating whether to request an urgent resource, and the fast UL grant request is included in a MAC control element (CE).

In addition, the present disclosure further includes transmitting downlink (DL) data to at least one of the first UE or the second UE, and the fast UL grant is transmitted when a fast response for the DL data is required.

In addition, in the present disclosure, the fast UL grant is transmitted through at least one of a common search space (CSS) or a UE-specific search space (USS).

In addition, in the present disclosure, when the fast UL grant is transmitted through the common search space (CSS), the fast UL grant is transmitted through a first Downlink Control Information (DCI) format, and the first DCI format is transmitted to the first UE and the second UE.

In addition, in the present disclosure, the first DCI format includes at least one of a second UE identifier for identifying the second UE, a first UE identifier for identifying the first UE or a resource information (RI) field in relation to withdrawal/preemption resource.

In addition, in the present disclosure, the resource information field in relation to withdrawal/preemption resource includes at least one of a subframe offset field representing how many subframes are from the subframe on which a fast UL grant is transmitted, an RB index field representing a resource block of the withdrawal/preemption resource or an RB number field representing a number of RBs allocated for the withdrawal/preemption resource.

In addition, the present disclosure further includes transmitting a second DCI format in relation to a fast UL withdraw for notifying withdrawal of a resource allocated to the first UE by the UL grant to the first UE.

In addition, in the present disclosure, the fast UL grant and the fast UL withdraw are transmitted through a UE-specific search space (USS).

In addition, in the present disclosure, the fast UL grant and the fast UL withdraw are CRC masked with a C-Radio Network Temporary Identifier (RNTI) of each UE.

In addition, in the present disclosure, when the second DCI format is transmitted through a common search space (CSS), the second DCI format includes a resource withdraw indicator for a physical resource index or resource withdraw information for a UL grant transmitted to the first UE or a resource withdraw indicator for a UE.

In addition, in the present disclosure, the resource withdraw indicator for a physical resource index is represented as a bitmap.

In addition, in the present disclosure, when the fast UL grant is transmitted through the UE-specific search space (USS), the fast UL grant is transmitted through a third Downlink Control Information (DCI) format, and the third DCI format includes at least one of a resource information (RI) field in relation to a preempted resource, HARQ process ID field in relation to the resource information field or a new data indicator (NDI) field indicating whether the UL resource allocated by the fast UL grant is for an initial transmission or a retransmission.

In addition, in the present disclosure, when the second DCI format is transmitted through the UE-specific search space (USS), the second DCI format includes a resource information (RI) field in relation to a withdrawn resource or a reallocation and HARQ process ID field in relation to the resource information field.

In addition, in the present disclosure, a base station for transmitting and receiving uplink (UL) data in a wireless communication system includes a radio frequency (RF) unit for transmitting and receiving a radio signal; and a processor functionally connected to the RF unit, the processor is configured to perform: transmitting a UL grant to a first user equipment (UE); transmitting a fast UL grant in relation to an urgent message transmission to at least one of the first UE or a second UE; and receiving the urgent message from the second UE through a UL resource allocated by the fast UL grant, and the UL resource allocated by the fast UL grant is a resource withdrawn from a resource allocated to the first UE by the UL grant.

Technical Effects

The present disclosure has an effect that a base station can allocate a UL resource for an urgent message quickly without resource collision with a other urgent user equipment or a normal user equipment that was allocated with a resource in advance by identifying an urgent PUSCH resource location of an urgent user equipment quickly by providing a fast UL grant transmission and reception method.

In addition, the fast UL grant transmission and reception method proposed in the present disclosure has an effect of decreasing time as much as 12*N or 13*N in comparison with the method according to the related art (17*N time is consumed) while providing the same reliability as the UL data transmission method through the conventional SR through fast UL grant/withdraw signaling. Here, N value represents a Time To Interval (TTI), and may be 1 ms for LTE.

The technical effects of the present disclosure are not limited to the technical effects described above, and other technical effects not mentioned herein may be understood to those skilled in the art from the description below.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of a network structure of an evolved universal terrestrial radio access network (E-UTRAN) to which the present invention can be applied.

FIG. 2 illustrates a radio interface protocol structure between a UE and an E-UTRAN in the wireless communication system to which the present invention can be applied.

FIG. 3 is a diagram for describing physical channels and a general signal transmission method using them used in the 3GPP LTE/LTE-A system to which the present invention can be applied.

FIG. 4 is a diagram showing the structure of a radio frame used in a 3GPP LTE/LTE-A system to which the present invention can be applied.

FIG. 5 shows an example of a resource grid for one downlink slot in the wireless communication system to which the present invention can be applied.

FIG. 6 shows a structure of a downlink subframe in the wireless communication system to which the present invention can be applied.

FIG. 7 shows a structure of an uplink subframe in the wireless communication system to which the present invention can be applied.

FIG. 8 illustrates the MAC PDU used in the MAC entity in the wireless communication system to which the present invention can be applied.

FIG. 9 and FIG. 10 illustrate the sub-header of the MAC PDU in the wireless communication system to which the present invention can be applied.

FIG. 11 illustrates formats of the MAC control elements in order to report the buffer state in the wireless communication system to which the present invention can be applied.

FIG. 12 illustrates a UL resource allocation procedure of a UE in the wireless communication system to which the present application can be applied.

FIG. 13 illustrates an example of a random access procedure to which present application can be applied.

FIG. 14 illustrates an example of a type in which PUCCH formats are mapped to a PUCCH region of an uplink physical resource block in the wireless communication system to which the present invention may be applied.

FIG. 15 shows the structure of an ACK/NACK channel in the case of a common CP in a wireless communication system to which an embodiment of the present invention may be applied.

FIG. 16 illustrates an example of asynchronous HARQ operation in downlink.

FIG. 17 illustrates an example of synchronous HARQ operation in downlink.

FIG. 18 is a diagram illustrating an example of DCI format 0.

FIGS. 19 and 20 are diagrams illustrating an example of a method for transmitting actual data through a scheduling request and BSR procedure.

FIG. 21 is a diagram illustrating an example of a method for transmitting actual data through RACH procedure.

FIG. 22 illustrates an example of a processing time.

FIGS. 23 and 24 illustrate an example of the simple UL grant format proposed in the present disclosure.

FIG. 25 is a flowchart illustrating an example of a fast retransmission method of UL data proposed in the present disclosure.

FIG. 26 is a diagram illustrating an example of a fast retransmission method of UL data using the simple UL grant format proposed in the present disclosure.

FIGS. 27 and 28 are diagrams illustrating a method for transmitting initial data of a UE using the simple UL grant format proposed in the present disclosure.

FIGS. 29 to 31 are diagrams illustrating a retransmission delay time compared with the conventional method when using the simple UL grant format proposed in the present disclosure.

FIG. 32 illustrates a block diagram of a wireless communication apparatus to which the methods proposed in the present disclosure may be applied.

FIG. 33 is a diagram illustrating another example of a new DCI format for a fast UL withdraw proposed in the present disclosure.

FIG. 34 illustrates an example of the case that a fast UL grant and a fast UL withdraw/regrant signaling are transmitted in n-2nd SF of a SF (nth) to be withdrawn and preempted.

FIG. 35 is a diagram illustrating an example of a new DCI format for a fast UL grant proposed in the present disclosure.

FIG. 36 is a diagram illustrating an example of a method of an initial transmission and a retransmission of UL data using a fast UL grant proposed in the present disclosure.

FIG. 37 illustrates an example of a DCI format newly defined for a fast UL withdraw proposed in the present disclosure.

FIG. 38 illustrates an example of a DCI format newly defined for a fast UL withdraw proposed in the present disclosure.

FIG. 39 is a diagram illustrating an example of a resource withdrawal procedure for a PRB index or a RBG index proposed in the present disclosure.

FIG. 40 is a diagram illustrating another example of a new DCI format for a fast UL withdraw proposed in the present disclosure.

FIG. 41 is a diagram illustrating another example of a new DCI format for a fast UL withdraw proposed in the present disclosure.

FIG. 42 illustrates the total required time for a UL data transmission through the conventional scheduling request (SR).

FIG. 43 is a diagram illustrating the total required time for a UL data transmission through the fast UL grant proposed in the present disclosure.

FIG. 44 illustrates a block diagram of a wireless communication apparatus to which the methods proposed in the present disclosure may be applied.

BEST MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, . . . , NRB×12-1) denotes an index of subcarrier in the frequency domain, and l(l=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9 (*a*)), otherwise, the 15-bit L field may be used (FIG. 9 (*b*)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11 (*a*), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 11 (*b*), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(b) exemplifies the UL resource allocation procedure for actual data in case that the UL radio resources for the BSR are allocated to a UE.

Referring to FIG. 12(b), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

Random Access Channel (RACH) Procedure

FIGS. 14a and 14b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 13a illustrates one example of a contention-based random access procedure, and FIG. 13b illustrates one example of a non-contention based random access procedure.

First, the contention-based random access procedure will be described with reference to FIG. 13a.

The UE receives information about random access from the eNB through system information and stores the received information. Afterwards, in case random access is needed, the UE transmits a random access preamble (which is also called a message 1) to the eNB S1301.

If the eNB receives a random access preamble from the UE, the eNB transmits a random access response message (which is also called a message 2) to the UE S1302. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1303. At this time, uplink transmission may be described as scheduled transmission.

After receiving the uplink transmission from the UE, the eNB transmits a message for contention resolution (which is also called a message 4) to the UE through a downlink shared channel (DL-SCH) S1304.

Next, a non-contention based random access procedure will be described with reference to FIG. 13b.

Before the UE transmits a random access preamble, the eNB allocates a non-contention random access preamble to the UE S1311.

The non-contention random access preamble can be allocated through a handover command or dedicated signaling such as signaling through the PDCCH. In case non-contention random access preamble is allocated to the UE, the UE transmits the allocated non-contention random access preamble to the eNB S1312.

Afterwards, similarly to the S1302 step of the contention-based random access procedure, the UE can transmit a random access response (which is also called a message 2) to the UE S1313.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated depending on whether a downlink data packet on a PDSCH has been successfully decoded or not. In an existing wireless communication system, 1 bit is transmitted as ACK/NACK information with respect to the transmission of downlink single codeword, and 2 bits are transmitted as ACK/NACK information with respect to the transmission of downlink 2 codewords.

The channel measurement information refers to feedback information related to a multiple input multiple output (MIMO) scheme, and may include a channel quality indicator (CQI), a precoding matrix index (PMI) and a rank indicator (RI). Pieces of these channel measurement information may be collectively expressed as a CQI.

For the transmission of a CQI, 20 bits may be used per subframe.

A PUCCH may be modulated using binary phase shift keying (BPSK) scheme and a quadrature phase shift keying (QPSK) scheme. Control information of a plurality of UEs may be transmitted through a PUCCH. If code division multiplexing (CDM) is performed to distinguish the signals of UEs, a constant amplitude zero autocorrelation (CAZAC) sequence of a length 12 is chiefly used. The CAZAC sequence has a characteristic in that it maintains constant amplitude in a time domain and a frequency domain, and thus has a property suitable for increasing coverage by lowering the peak-to-average power ratio (PAPR) or cubic metric (CM) of a UE. Furthermore, ACK/NACK information for downlink data transmission transmitted through a PUCCH is covered using orthogonal sequence or orthogonal cover (OC).

Furthermore, control information transmitted on a PUCCH may be distinguished using a cyclically shifted sequence having a different cyclic shift (CS) value. The cyclically shifted sequence may be generated by cyclically shifting a base sequence by a specific CS amount. The specific CS amount is indicated by a CS index. The number of available cyclic shifts may be different depending on the latency spread of a channel A variety of types of sequences may be used as the base sequence, and the aforementioned CAZAC sequence is an example thereof.

Furthermore, the amount of control information which may be transmitted by a UE in one subframe may be determined depending on the number of SC-FDMA symbols which may be used to send control information (i.e., SC-FDMA symbols other than an SC-FDMA symbol used in the transmission of a reference signal (RS) for the coherent detection of a PUCCH.

In the 3GPP LTE system, a PUCCH is defined as a total of different formats depending on transmitted control information, a modulation scheme and the amount of control information. The attributes of uplink control information (UCI) transmitted may be summarized as in Table 4 below depending on each PUCCH format.

TABLE 4

| PUCCH format | Modulation scheme | # of bits per subframe | Usage |
| --- | --- | --- | --- |
| 1(x) | N/A | N/A | Scheduling Request |
| 1a | BPSK | 1 | 1-bit A/N + SR |
| 1b | QPSK | 2 | 2-bits A/N + SR |
| 2x | QPSK | 20 | CQI or CQI + A/N |
| 2a | QPSK + BPSK | 20 + 1 | CQI + 1-bit A/N |
| 2b | QPSK + BPSK | 20 + 2 | CQI + 2-bits A/N |
| 3 | QPSK | 48 | A/N + SR |

PUCCH format 1(x) is used for SR-only transmission. In the case of SR-only transmission, a waveform which is not modulated is applied.

The PUCCH format 1a or 1b is used to transmit HARQ ACK/NACK. In the case that HARQ ACK/NACK is solely transmitted in a specific subframe, PUCCH format 1a or 1b may be used. Alternatively, HARQ ACK/NACK and an SR may be transmitted in the same subframe using PUCCH format 1a or 1b.

As described above, PUCCH format 1a or 1b may be used for the case that an SR is transmitted together with HARQ ACK/NACK. A PUCCH index for HARQ ACK/NACK is implicitly determined from a lower CCE index which is mapped for the related PDCCH.

Multiplexing Negative SR with A/N
: A UE transmits A/N to A/N PUCCH resource which is mapped to the lowest CCE index used in a PDCCH.

Multiplexing Positive SR with A/N
: A UE transmits A/N using the SR PUCCH resource allocated from an eNB.

PUCCH format 2 is used for the transmission of a CQI, and PUCCH format 2a or 2b is used for the transmission of a CQI and HARQ ACK/NACK.

In the case of the extended CP, PUCCH format 2 may also be used for the transmission of a CQI and HARQ ACK/NACK.

An SR resource of a UE is setup/released through an RRC Connection Reconfig. (Radio Resource Config. Dedicated (Physical config. Dedicated (SR config))).

Here, SR resource for maximum 2048 UEs is available to be allocated in one subframe. This means that 2048 logical indexes are defined for PUCCH, and the physical resource for PUCCH formats 1 to 3 may be mapped up to 2048 logically.

It is designed that an SR periodicity may be set to 1 ms to 80 ms according to an SR configuration index in the configuration of SR resource per UE, and an SR subframe offset is also configured according to an index.

An SR signaling of a UE is defined to use simple On-Off Keying (O.O.K) scheme, and defined to mean that D(0)=1: Request a PUSCH resource (positive SR), Transmitting nothing: not request to be scheduled (negative SR).

In addition, an SR is designed to use the CAZAC sequence having the length of 12 and the OC sequences having the length of 3 such that the SR for maximum 36 UEs is able to be allocated through PUCCH 1 RB (in the case of the Normal CP).

A DMRS position of PUCCH format 1/1a/1b(A/N, SR) will be described in detail below in FIG. 14.

FIG. 14 illustrates an example of a type in which PUCCH formats are mapped to a PUCCH region of an uplink physical resource block in the wireless communication system to which the present invention may be applied.

In FIG. 14, $N_{RB}^{UL}$ represents the number of resource blocks in the uplink, and $0, 1, \ldots, N_{RB}^{UL}-1$ mean the numbers of physical resource blocks. Basically, the PUCCH is mapped to both edges of an uplink frequency block. As illustrated in FIG. 14, PUCCH format 2/2a/2b is mapped to a PUCCH region expressed as m=0, 1 and this may be expressed in such a manner that PUCCH format 2/2a/2b is mapped to resource blocks positioned at a band edge. Furthermore, both PUCCH format 2/2a/2b and PUCCH format 1/1a/1b may be mixedly mapped to a PUCCH region expressed as m=2.

Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to UEs in a cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency unit (or a frequency resolution) to be measured may be controlled by an eNB. In the time domain, periodic and aperiodic CQI reporting may be supported. PUCCH format 2 may be used for only the periodic reporting and the PUSCH may be used for aperiodic reporting. In the case of the aperiodic reporting, an eNB may instruct a UE to transmit a scheduling resource on which an individual CQI reporting is carried for the uplink data transmission.

PUCCH Channel Structure

The PUCCH formats 1a and 1b are described.

In the PUCCH formats 1a/1b, a symbol modulated using the BPSK or QPSK modulation scheme is multiplied by a CAZAC sequence of a length 12. For example, the results of the multiplication of a modulation symbol d(0) by a CAZAC sequence r(n) (n=0, 1, 2, ..., N−1) of a length N are y(0), y(1), y(2), ..., y(N−1). y(0), ..., y(N−1) symbols may be called a block of symbols. After a modulation symbol is multiplied by a CAZAC sequence, block-wise spreading using an orthogonal sequence is applied.

A Hadamard sequence of a length 4 is used for common ACK/NACK information, and a discrete Fourier transform (DFT) sequence of a length 3 is used for shortened ACK/NACK information and a reference signal.

A Hadamard sequence of a length 2 is used for a reference signal in the case of an extended CP.

FIG. 15 shows the structure of an ACK/NACK channel in the case of a common CP in a wireless communication system to which an embodiment of the present invention may be applied.

FIG. 15 illustrates the structure of a PUCCH channel for the transmission of HARQ ACK/NACK without a CQI.

A reference signal (RS) is carried on three contiguous SC-FDMA symbols that belong to seven SC-FDMA symbols included in one slot and that are located in the middle part, and an ACK/NACK signal is carried on the remaining four SC-FDMA symbols.

In the case of an extended CP, an RS may be carried on two contiguous symbols in the middle. The number and location of symbols used for an RS may be different depending on a control channel. The number and location of symbols used for an ACK/NACK signal associated with the RS may also be changed depending on the RS.

Pieces of acknowledgement information (an unscrambled state) of 1 bit and 2 bits may be expressed as one HARQ ACK/NACK modulation symbol using the BPSK and QPSK modulation schemes, respectively. Positive acknowledgement (ACK) may be encoded into "1", and negative acknowledgement (NACK) may be encoded into "0."

2-dimensional spreading is applied in order to improve a multiplexing capacity when a control signal is transmitted within an allocated band. That is, in order to increase the number of UEs or the number of control channels that may be multiplexed, frequency domain spreads and time domain spreads are applied at the same time.

In order to spread an ACK/NACK signal in the frequency domain, a frequency domain sequence is used as a base sequence. A Zadoff-Chu (ZC) sequence, that is, one of CAZAC sequences, may be used as a frequency domain sequence. For example, the multiplexing of different UEs or different control channels may be applied by applying a different cyclic shift (CS) to a ZC sequence, that is, a base sequence. The number of CS resources supported in an SC-FDMA symbol for PUCCH RBs for the transmission of HARQ ACK/NACK is set by a cell-specific higher layer signaling parameter $\Delta_{shift}^{PUCCH}$.

An ACK/NACK signal on which frequency domain spreading has been performed is spread in the time domain using orthogonal spreading code. A Walsh-Hadamard sequence or DFT sequence may be used as the orthogonal spreading code. For example, an ACK/NACK signal may be spread using orthogonal sequences w0, w1, w2 and w3 of a length 4 with respect to four symbols. Furthermore, an RS is also spread through an orthogonal sequence of a length 3 or a length 2. This is called orthogonal covering (OC).

A plurality of UEs may be multiplexed according to a code division multiplexing (CDM) method using the aforementioned CS resources in the frequency domain and the aforementioned OC resources in the time domain. That is, the ACK/NACK information and RSs of a large number of UEs on the same PUCCH RB may be multiplexed.

With respect to such time domain spreading CDM, the number of spreading codes supported with respect to ACK/NACK information is limited by the number of RS symbols. That is, since the number of RS transmission SC-FDMA symbols is smaller than that of ACK/NACK information transmission SC-FDMA symbols, the multiplexing capacity of an RS is smaller than that of ACK/NACK information.

For example, in the case of a common CP, ACK/NACK information may be transmitted in four symbols. Three orthogonal spreading codes not four orthogonal spreading codes are used for ACK/NACK information. The reason for this is that since the number of RS transmission symbols is limited to three, only the three orthogonal spreading codes may be used for an RS.

In the case where three symbols are used to send an RS and four symbols are used to send ACK/NACK information in one slot of a subframe of a common CP, for example, if six CSs can be used in the frequency domain and three orthogonal cover (OC) resources can be used in the time domain, HARQ acknowledgement from a total of 18 different UEs may be multiplexed within one PUCCH RB. In the case where two symbols are used to send an RS and four symbols are used to send ACK/NACK information in one slot of a subframe of an extended CP, for example, if six CSs can be used in the frequency domain and two orthogonal cover (OC) resources can be used in the time domain, HARQ acknowledgement from a total of 12 different UEs may be multiplexed within one PUCCH RB.

The PUCCH format 1 is described below. A scheduling request (SR) is transmitted in such a manner that a UE requests scheduling or does not scheduling. An SR channel reuses the ACK/NACK channel structure in the PUCCH formats 1a/1b and is configured according to an on-off keying (OOK) method based on the ACK/NACK channel design. A reference signal is not transmitted in the SR channel. Accordingly, a sequence of a length 7 is used in the case of a common CP, and a sequence of a length 6 is used in the case of an extended CP. Different cyclic shifts or orthogonal covers may be allocated to an SR and ACK/NACK. That is, for positive SR transmission, a UE transmits HARQ ACK/NACK through resources allocated for the SR. For negative SR transmission, a UE transmits HARQ ACK/NACK through resources allocated for ACK/NACK.

An enhanced-PUCCH (e-PUCCH) format is described below. The e-PUCCH may correspond to the PUCCH format 3 of the LTE-A system. A block spreading scheme may be applied to ACK/NACK transmission using the PUCCH format 3.

The block spreading scheme is a method of modulating the transmission of a control signal using the SC-FDMA method unlike the existing PUCCH format 1 series or 2 series. As shown in FIG. 8, a symbol sequence may be spread on the time domain using orthogonal cover code (OCC) and transmitted. The control signals of a plurality of UEs may be multiplexed on the same RB using the OCC. In the case of the aforementioned PUCCH format 2, one symbol sequence is transmitted in the time domain and the control signals of a plurality of UEs are multiplexed using the cyclic shift (CS) of a CAZAC sequence. In contrast, in the case of a block spreading-based PUCCH format (e.g., the PUCCH format 3), one symbol sequence is transmitted in the frequency domain and the control signals of a plurality of UEs are multiplexed using time domain spreading using the OCC.

HARQ Process in LTE/LTE-A System

In the current LTE, 8 HARQ process is used for withdrawing error of data, and two types of HARQ are defined according to retransmission timing of data as follows.

FIG. 16 illustrates an example of asynchronous HARQ operation in downlink.

Referring to FIG. 16, when transmitting retransmission data, an eNB that receives NACK transmits the data by setting NDI in a DL grant (DCI format 1) as a bit that represents a retransmission. In this case, the NDI includes HARQ process ID, and represents which data is retransmitted.

FIG. 17 illustrates an example of synchronous HARQ operation in downlink.

Referring to FIG. 17, an eNB that transmits NACK transmits retransmission data with the same resource as an initial data transmission by allocating data resource for retransmission to a new resource by setting NDI in a DL grant (DCI format 1) as a bit that represents a retransmission, or omitting a UL grant. In this case, the retransmission timing is always fixed at the subframe after 4 ms when receiving NACK.

The HARQ scheme tries to correct error for a received code basically, and determines whether to retransmit it by using simple error detection code such as Cyclic Redundancy Check (CRC). For a retransmission, the HARQ scheme is divided into three types as follows, and LTE performs the HARQ scheme through CC (second technique) or IR (third technique).

1) Type-I HARQ Scheme: A receiver discards a packet having an error and requests for retransmission, and a transmitter transmits the packet which is the same as that of an initial transmission. By discarding a packet having an error, an increase in reliability of a system and a performance increase through FEC are obtained.

2) Type-I HARQ Scheme with Chase Combining: This is a technique, instead of discarding a packet having an error, of using the packet by combining it with a retransmitted packet. By combining several packets, an effect of increasing signal power may be obtained, consequently.

3) Type-II HARQ Scheme (Incremental redundancy Scheme): This is a technique of using a code of high code rate in an initial transmission and transmitting an additional redundancy when a retransmission occurs in order to prevent the case of transmitting a code of high redundancy in an initial transmission unnecessarily in the case of Type-I.

PHICH(Physical HARQ Indication Channel)

A PHICH is described below.

In the LTE system, since SU-MIMO is not supported in uplink, one PHICH transmits only the PUSCH of one UE, that is, 1-bit ACK/NACK for a single stream.

The 1-bit ACK/NACK is coded into three bits using a repetition code whose code rate is 1/3. Three modulation symbols are generated by modulating the coded ACK/NACK according to a binary phase key-shifting (BPSK) method. The modulation symbol is spread using a spreading factor (SF)=4 in a normal CP structure and using SF=2 in an extended CP structure.

When the modulation symbols are spread, an orthogonal sequence is used. The number of orthogonal sequences used becomes SF*2 in order to apply I/Q multiplexing.

PHICHs spread using the SF*2 orthogonal sequence may be defined as one PHICH group. Layer mapping is performed on the spread symbols. The layer-mapped symbols are subjected to resource mapping and transmitted.

A PHICH transmits HARQ ACK/NACK according to PUSCH transmission. A plurality of PHICHs mapped to the resource elements of the same set forms a PHICH group. The PHICHs within the PHICH group are distinguished by different orthogonal sequences. In the FDD system, $n_{PHICH}^{group}$ that is the number of PHICH groups is constant in all of subframes, and may be determined by Equation 1.

$$N_{PHICH}^{group} = \begin{cases} \lceil N_g(N_{RB}^{DL}/8) \rceil, & \text{for normal cyclic prefix} \\ 2 \times \lceil N_g(N_{RB}^{DL}/8) \rceil, & \text{for extended cyclic prefix} \end{cases} \quad \text{[Equation 1]}$$

In Equation 1, Ng is transmitted in a higher layer through a physical broadcast channel (PBCH), and Ng∈{1/6,1/2,1, 2}. The PBCH carries system information that is essential for a UE to communicate with an eNB. System information transmitted through the PBCH is called a master information block (MIB).

In contrast, system information transmitted through a physical downlink control channel (PDCCH) is called a system information block (SIB). $N_{RB}^{DL}$ is a downlink bandwidth configuration expressed by a multiplication of $N_{SC}^{RB}$, that is, the size of a resource block in the frequency domain A PHICH group index $n_{PHICH}^{group}$ is any one integer of 0 to $n_{PHICH}^{group}-1$.

Resources used for a PHICH may be determined based on the smallest PRB index when the resources of a PUSCH are allocated and the cyclic shift value of a demodulation reference signal (DMRS) transmitted in an uplink (UL) grant.

Resources to which a PHICH is mapped (hereinafter referred to as "PHICH resources") may be expressed as ($n_{PHICH}^{group}$, $n_{PHICH}^{seq}$), that is, an index pair. $n_{PHICH}^{group}$ indicates a PHICH group index, and $n_{PHICH}^{seq}$ indicates an orthogonal sequence index within the PHICH group. The ($n_{PHICH}^{group}$, $n_{PHICH}^{seq}$) may be determined by Equation 2 below.

$$n_{PHICH}^{group}=(I_{PRB\_RA}+n_{DMRS}) \bmod N_{PHICH}^{group}+ I_{PHICH}N_{PHICH}^{group}, n_{PHICH}^{seq}=(\lfloor I_{PRB\_RA}/ N_{PHICH}^{group}\rfloor+n_{DMRS}) \bmod 2N_{SF}^{PHICH}$$ [Equation 2]

In Equation 2, the nDMRS is mapped from a cyclic shift for a demodulation reference signal (DMRS) field in the most recent PDCCH having an uplink DCI format for a transport block, which is related to the transmission of a corresponding PUSCH.

In contrast, if a PDCCH having an uplink DCI format for the same transport block is not present, an initial PUSCH for the same transport block is scheduled semi-persistently or when the initial PUSCH is scheduled by a random access response approval signal, the nDMRS is set to 0.

$N_{SF}^{PHICH}$ indicates a spreading factor size used for PHICH modulation.

$I_{PRB\_RA}$ is the same as $I_{PRB\_RA}^{lowerest\_index}$ if it is the first transport block of a PUSCH related to a PDCCH or if the number of transport blocks manually recognized when a related PDCCH is not present is not the same as the number of transport blocks indicated in the most recent PDCCH related to the corresponding PUSCH.

In contrast, if it is the second transport block of a PUSCH related to the PDCCH, it is the same as $I_{PRB\_RA}^{lowest\_index}+1$. In this case, $I_{PRB\_RA}^{lowest\_index}$ corresponds to the lowest PRB index of the first slot of the transmission of the corresponding PUSCH.

$n_{PHICH}^{group}$ indicates the number of PHICH groups configured by a higher layer.

$I_{PHICH}$ has "1" if a PUSCH is transmitted in a subframe index 4 or 9 and "0" if not in the uplink-downlink configuration 0 of a TDD system.

Table 5 shows a mapping relation between a cyclic shift for a DMRS field used to determine PHICH resources in a PDCCH having an uplink DCI format and an nDMRS.

TABLE 5

| Cyclic Shift for DMRS Field in PDCCH with uplink DCI format | nDMRS |
|---|---|
| 000 | 0 |
| 001 | 1 |
| 010 | 2 |
| 011 | 3 |
| 100 | 4 |
| 101 | 5 |
| 110 | 6 |
| 111 | 7 |

DCI Format 0 (UL Grant) in LTE/LTE-A System

FIG. 18 is a diagram illustrating an example of DCI format 0.

In LTE a PUSCH resource is allocated through a UL grant of an eNB.

By transmitting DCI format 0 CRC masked by C-RNTI of a UE through a PDCCH, the LTE UL grant makes a UE to generate uplink data and transmit it according to an instruction of an eNB through receiving the corresponding information.

That is, FIG. 18 and Table 6 represent parameters of DCI format 0.

TABLE 6

| Format 0 (release 8) | Format 0 (release 8) |
|---|---|
| | Carrier Indicator |
| Flag for format 1A differentiation | Flag for format 0/format 1A differentiation |
| Hopping flag | Hopping flag |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic Shift for DM RS | Cyclic Shift for DM RS |
| UL index (TDD only) | UL index (TDD only) |
| Downlink Assignment Index (DAI) | Downlink Assignment Index (DAI) |
| CQI request (1 bit) | CSI request |
| | (1 or 2 bits: 2 bits are multi carrier) |
| | SRS request |
| | Resource allocation type |

Herein, the lengths of Hopping flag and RIV may have different lengths according to a system bandwidth as follows.

Hopping Flag

: 1 (1.4/3/5 Mhz) or 2 (10/15/20 Mhz) bits

Resource Block Assignment

: 5 (1.4 Mhz), 7 (3/5 Mhz), 11 (10 Mhz), 12 (15 Mhz), 13 (20 Mhz) bits

A UL data transmission method in LTE (-A) or 802.16m is briefly described.

The cellular system such as LTE (-A) or 802.16m uses a resource allocation scheme based on an eNB scheduling.

In the system that uses the resource allocation scheme based on an eNB scheduling as such, a UE that has data to transmit (i.e., UL data) requests a resource for transmitting the corresponding data to an eNB before transmitting the data.

The scheduling request of a UE may be performed through a Scheduling Request (SR) transmission to a PUCCH or a Buffer Status Report (BSR) transmission to a PUSCH.

In addition, in the case that a resource for transmitting the SR or the BSR is not allocated to a UE, the UE may request an uplink resource to an eNB through the RACH procedure.

As such, an eNB that receives the scheduling request from a UE allocates the uplink resource that the corresponding UE is going to use to the UE through a downlink control channel (i.e., UL grant message, DCI in the case of LTE (-A)).

In this case, the UL grant transmitted to the UE may indicate which subframe the resource that is allocated to the UE corresponds to by explicit signaling, but may also define an appointed time between the UE and the eNB using the resource allocation for the subframe after a specific time (e.g., 4 ms in the case of LTE).

As such, the case that an eNB allocates a resource after X ms (e.g., 4 ms in the case of LTE) to a UE means that the eNB allocates the resource of UE by considering all of the times for receiving and decoding a UL grant and for preparing and encoding the data to transmit.

DCI Format 3/3A in LTE/LTE-A System

In the case of LTE(-A), DCI format 3/3A may be used for a power control of a PUCCH or a PUSCH.

DCI format 3/3A may be constructed by N TPC commands as represented in Table 7 or Table 8 below.

Here, N may be preconfigured to a UE through an RRC message. Such DCI format 3/3A may transmit information of 2N/N bits length, and is transmitted through a common search space by being CRC masked with TPC-RNTI.

A UE performs a power control for transmitting data to a PUCCH or a PUSCH by receiving a TPC command that corresponds to its own location.

TABLE 7

Format 3 (release 8) - TPC-RNTI

| Field Name | Length (Bits) | Comment |
|---|---|---|
| TPC command number 1 | 2 | |
| TPC command number 2 | 2 | |
| TPC command number 3 | 2 | |
| ... | | |
| TPC command number N | 2 | The size of N is dependent on the payload size of DCI format 0 for the system BW |

TABLE 8

Format 3A (release 8) - TPC-RNTI

| Field Name | Length (Bits) | Comment |
|---|---|---|
| TPC command number 1 | 1 | |
| TPC command number 2 | 1 | |
| TPC command number 3 | 1 | |
| ... | | |
| TPC command number N | 1 | The size of N is dependent on the payload size of DCI format 0 for the system BW |

Hereinafter, a procedure for an eNB to send down a PDCCH to a UE will be described.

FIG. 19 is a block diagram illustrating a structure of a PDCCH.

A BS determines a PDCCH format according to DCI to be transmitted to a UE, attaches a CRC to control information, and masks a unique identifier (referred to as a radio network temporary identifier (RNTI)) to the CRC according to an owner or usage of the PDCCH (block 1910).

In the case that the PDCCH is for a specific wireless device, a unique identifier (e.g., cell-RNTI (C-RNTI)) of the UE may be masked to the CRC.

Alternatively, in the case that the PDCCH is for a paging message, a paging indication identifier (e.g., paging-RNTI (P-RNTI)) may be masked to the CRC.

In the case that the PDCCH is for system information, a system information identifier (e.g., system information-RNTI (SI-RNTI)) may be masked to the CRC. In order to indicate a random access response that is a response for transmission of a random access preamble of the UE, a random access-RNTI (RA-RNTI) may be masked to the CRC. In order to indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 1920).

Encoding includes channel encoding and rate matching.

The encoded data is modulated to generate modulation symbols (block 1930).

The modulation symbols are mapped to physical resource elements (REs) (block 1940). The modulation symbols are respectively mapped to the REs.

FIG. 20 illustrates an example of resource mapping of a PDCCH.

Referring to FIG. 20, R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

One REG (indicated by a quadruplet in the drawing) includes 4 REs. One CCE includes 9 REGs.

The number of CCEs used to configure one PDCCH may be selected from {1, 2, 4, 8}. Each element of {1, 2, 4, 8} is referred to as a CCE aggregation level.

A control channel including one or more CCEs performs interleaving in unit of REG, and is mapped to a physical resource after performing cyclic shift based on a cell identifier (ID).

FIG. 21 illustrates an example of distributing CCEs across a system band.

Referring to FIG. 21, a plurality of logically contiguous CCEs is input to an interleaver. The interleaver permutes the sequence of the plurality of input CCEs on an REG basis.

Accordingly, the time/frequency resources of one CCE are physically distributed to a total time/frequency area in the control region of a subframe. As a consequence, while the control channel is configured on a CCE basis, it is interleaved on an REG basis, thereby maximizing frequency diversity and an interference randomization gain.

FIG. 22 illustrates an example of PDCCH monitoring.

In 3GPP LTE, blind decoding is used to detect a PDCCH. Blind decoding is a process of de-masking a cyclic redundancy check (CRC) of a received PDCCH (PDCCH candidate) with a desired identifier to check a CRC error, thereby allowing a UE to identify whether the PDCCH is a control channel of the UE. A UE does not recognize a position in which a PDCCH thereof is transmitted in a control region and a CCE aggregation level or DCI format used to transmit the PDCCH.

A plurality of PDCCHs may be transmitted in one subframe. A UE monitors a plurality of PDCCHs in each subframe.

Here, the monitoring refers to an attempt of a UE to decode a PDCCH according to a monitored PDCCH format.

In 3GPP LTE, a search space is used to reduce load caused by blind decoding. A search space may denote a monitoring set of CCEs for a PDCCH. A UE monitors a PDCCH in a corresponding search space.

A search space is divided into a common search space and a UE-specific search space. The common search space is a space for searching for a PDCCH having common control information, which includes 16 CCEs with CCE indexes of 0 to 15 and supports a PDCCH having a CCE aggregation level of {4, 8}. However, a PDCCH (DCI format 0 and 1A) carrying UE-specific information may also be transmitted to the common search space. The UE-specific search space supports a PDCCH having a CCE aggregation level of {1, 2, 4, 8}.

TABLE 9

| Search Space Type | Aggregation Level (L) | Size (in CCEs) | Number of PDCCH candidates | DCI formats |
| --- | --- | --- | --- | --- |
| UE-Specific | 1 | 6 | 6 | 0, 1, 1A, 1B, 1C, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 6 | 2 | |

A size of a search space is determined by Table 9 above, and a different start point of a search space is defined for a common search space and a UE-specific search space. A start point of a common search space is fixed regardless of subframes, while a start point of a UE-specific search space may change by subframe according to an UE ID (e.g., C-RNTI), a CCE aggregation level and/or a slot number in a radio frame. When the start point of the UE-specific search space is in the common search space, the UE-specific search space and the common search space may overlap.

In an aggregation level of $L \in \{1, 2, 4, 8\}$, a search space $S^{(L)}_k$ is defined as an aggregation of PDCCH candidates. A CCE that corresponds to PDCCH candidate m of a search space $S^{(L)}_k$ is given as below.

$$L \cdot \left\{ (Y_k + m) \bmod \left\lfloor \frac{N_{CCE,k}}{L} \right\rfloor \right\} + i \qquad \text{[Equation 4]}$$

Here, $i=0, 1, \ldots, L-1$, $m=0, \ldots, M^{(L)}-1$, $N_{CCE,k}$ are total number of a CCE that may be used for a transmission of a PDCCH in a control region of subframe k.

A control region includes an aggregation of CCEs numbered from 0 to $N_{CCE,k}-1$. $M^{(L)}$ is the number of PDCCH candidates in CCE aggregation level L in a given search space. In a common search space, $Y_k$ is set to 0 with respect to two aggregation levels, L=4 and L=8. In a UE-specific search space of aggregation level L, variable $Y_k$ is defined as below.

$$Y_k = (A \cdot Y_{k-1}) \bmod D \qquad \text{[Equation 5]}$$

Here, $Y_{-1} = n_{RNTI} \neq 0$, A=39827, D=65537, k=floor($n_s/2$) and $n_s$ are slot number in a radio frame.

FIG. 23 is a diagram illustrating a time until a UE transmits actual data through 5 step scheduling request procedure using PUCCH SR resource.

As shown in FIG. 23, a UE may transmit actual uplink data after about 17 ms from the time of transmitting an SR signal.

In this case, the SR resource allocated to the UE may be allocated to a PUCCH with a specific period, minimum 1 ms to maximum 80 ms.

Here, in the case that the SR of 1 ms period is allocated to the corresponding UE, an average time for the UE to wait for the PUCCH resource for an SR transmission is 0.5 ms, and the delay time until the data transmission through a scheduling request to an eNB takes 17.5 ms.

In the case that a UE has an uplink resource allocated from an eNB beforehand, the UE may transmit the resource request for newly generated data by using the resource allocated beforehand.

Alternately, the UE may request an additional resource by transmitting a BSR together with the data transmitted with the resource allocated beforehand.

In this case, as shown in FIG. 24, the delay of 9 ms occurs until transmitting uplink data after a UE request a BSR.

In the case that there is no PUCCH SR resource or PUSCH resource that the UE is allocated from the eNB or the uplink is not synchronized, the UE may request the resource for the newly generated data using the RACH procedure.

That is, as shown in FIG. 25, the delay of 17 ms occurs until the UE transmits uplink data from the time of transmitting the RACH preamble to the eNB.

In this case, the PRACH resource that is available to transmit the RACH preamble may be configured with a specific period for each cell. Assuming the PRACH resource has the period of minimum 1 ms, the data transmission delay of average 17.5 ms may occur.

As described in FIG. 23 to FIG. 25, the UE may transmit actual data by undergoing the delay of minimum 9 ms to maximum 17.5 ms for transmitting uplink data.

Accordingly, the eNB allocates an optimal resource to each UE in a channel environment, and accordingly, the resource efficiency may be maximized, but the transmission delay occurs.

The requirement of 5G is increasing for supporting various real time application services such as health care, traffic safety, disaster safety, remote medical control, and so on.

Accordingly, 5G sets it as a goal to construct an ultra low latency system that has an extremely short response time to the extent that a user is unable to notice even in the case that the tactility information which is mostly sensitive to the delay time among five senses of a human is provided through an internet (target delay: E2E or Radio 1 ms).

Delay of a data transmission is needed to be minimized in order to provide such a 5G communication service, but a data transmission of a current system is designed to cause delay additionally as below.

Downlink Data Transmission Delay
Connected UE: 0 ms (no delay)
Dormant UE: Average 1 ms to 280 ms delay occurs depending on DRX cycle set to a UE (short DRX cycle: 2~640 ms, long DRX cycle: 10~2560 ms).
Idle UE: Average 160 ms, 280 ms+initial access delay occurs depending on paging DRX cycle set to a UE (paging cycle: 320~2560 ms, initial access: 50 ms~100 ms (LTE-A: 50 ms/LTE: 100 ms)).

Uplink Data Transmission Delay

Synchronized & dormant UE: 17.5 ms delay occurs (5-step SR).

Unsynchronized UE: 17.5 ms delay occurs (SR through RACH).

Connected UE to which uplink resource is allocated: 9 ms (Data is transmitted through BRS transmission)

As such, various time delays may occur in transmission/reception of data for a UE depending on the state of UE, and particularly, delay of downlink data reception may occur with various lengths for a UE in a dormant or idle state.

However, this is one of methods for decreasing power consumption of a UE, and it is required to examine closely a relationship between data reception delay and power consumption.

However, for the data transmission delay in an uplink data transmission, it is identified that additional delay is bound to occur since a UE uses the data transmission scheme based on an eNB scheduling although the UE is able to transmit data whenever it is required.

A service which may prevent a secondary accident or respond an emergency situation rapidly is expected to be provided as a main low latency service of future 5G communication, by quickly notifying information of an accident or state that may occur due to a specific event on an unpredictable time from a various end users such as a human, a machine (vehicle or sensor), or the like to an eNB or a neighboring UE/user.

Such a low latency service makes it possible to perform a subsequent procedure by transmitting mainly uplink data quickly.

Owing to this, a fast transmission of unlink data which is an initiation step of a corresponding service s one of important factors that influences overall service delay.

Due to the reasons above, in order to support a low latency service of a new 5G communication, it is considered that delay in an uplink data transmission is a factor that should be decreased necessarily.

Hereinafter, a fast UL data transmission method proposed in the present disclosure will be described, which is to support a low latency service in a wireless communication system such as 5G.

FIG. 26 is a diagram illustrating overall flow of a fast uplink data transmission method proposed in the present disclosure.

FIG. 26 shows a basic configuration of a fast uplink data transmission method for supporting a low latency service proposed in the present disclosure.

As shown in FIG. 26, a basic configuration proposed in the present disclosure may be as follows. Detailed description and an operation method of a UE for each element will be described below.

1. Triggering conditions for a fast UL grant
2. A method for transmitting and receiving a fast UL grant
(1) Fast UL grant transmission and reception in a common search space (CSS)
(2) Fast UL grant transmission and reception in a UE-specific search space (USS)
(3) Fast UL grant transmission and reception in a USS for urgent UEs and fast UL grant transmission and reception in a CSS for general UEs Referring to FIG. 26, an eNB transmits a UL grant for a UL data that a general UE(s) is intended to transmit in $N+4^{th}$ subframe to a general UE(s) in $N^{th}$ (N=1) subframe.

Here, in the case that an urgent UE(s) transmits a fast UL grant request to the eNB in order to transmit an urgent message and the like in $N^{th}$ subframe, the eNB transmits a fast UL grant to the general UE(s) and/or the urgent UE(s).

'A and/or B' may be interpreted as a meaning of 'at least one of A or B is included'.

When the general UE(s) receives a fast UL grant from the eNB, the general UE(s) does not use a PUSCH resource allocated for a UL data transmission in $N+4^{th}$ subframe.

That is, the PUSCH resource allocated for a UL data transmission in $N+4^{th}$ subframe is withdrawn.

When the urgent UE(s) receives a fast UL grant from the eNB, the urgent UE(s) transmits an urgent message and the like to the eNB using the withdrawn resource in the general UE(s).

The resource withdrawn from the general UE(s) may be represented as a resource that is preoccupied by the urgent UE(s).

As described in FIG. 26, in the case that a specific UE (e.g., urgent UE) is placed in an urgent situation, the present disclosure provides a method for quickly transmitting its own position, situation information and the like to an eNB with low error rate.

Specifically, in the case of a service that an event of urgent situation occurs in the same location simultaneously for one or more UEs, among urgent services (e.g., a service that a specific urgent message transmission is required by an occurrence of collision between vehicles like traffic safety), one or more UEs may transmit an urgent signal simultaneously in the same sub-frame (TTI), and may request to use an urgent resource simultaneously.

That is, for the case that one or more UEs (e.g., urgent UE) require urgent resource preoccupation, the present disclosure provides a method for allocating a fast UL resource without collision between UEs.

Hereinafter, the basic configurations for performing the method proposed in the present disclosure (1. triggering conditions for fast UL grant, and 2. methods for transmitting and receiving fast UL grant) will be described in more detail.

Triggering Conditions for Fast UL Grant

First, triggering conditions for transmitting fast UL grant to UE(s) in an eNB will be described.

The fast UL grant proposed in the present disclosure may be transmitted in (1) the case of receiving fast UL grant from a UE or (2) the case of preoccupying or allocating resource for a specific UE under a determination of an eNB.

That is, the conditions for triggering the fast UL grant may be implemented by various methods, which will be described by exemplifying first to fifth embodiments below.

First Embodiment

A first embodiment is a method for triggering a fast UL grant transmission of an eNB by transmitting a PUCCH urgent signal (US) for urgent service(s) or a scheduling request (SR) to the eNB.

That is, in the first embodiment, a PUCCH signaling indicating (meaning) a request of a fast UL resource allocation (fast UL grant) is transmitted to an eNB.

The PUCCH signaling may mean signaling of a specific purpose (SR of a resource request for an urgent service) through a PUSCH US or multiple SR configurations which is newly defined.

Accordingly, when an eNB receives the PUCCH signaling from a specific UE(s), the eNB transmits the fast UL grant.

Second Embodiment

A second embodiment is a method for triggering a fast UL grant of an eNB by transmitting a buffer state report (BSR) for an urgent service(s) to the eNB.

That is, the second embodiment may be performed by transmitting a PUSCH signaling indicating a request of a fast UL resource allocation.

In order to implement the second embodiment, the following properties may be defined.

Logical Channel Group (LCG) for urgent services: The BSR for the corresponding LCG may mean a fast UL resource allocation request.

Logical channel for an urgent service: This property may mean a fast UL resource allocation request, in the case that a specific logical channel is defined for a channel for an urgent service when a radio bearer (BR) is configured and a BSR for the specific logical channel is transmitted.

BSR transmitted to a specific resource region: A specific resource region may mean a specific physical resource region defined for a fast UL data transmission. As an example of the specific resource region, a contention resource may be exemplified. Here, the contention resource is a predefined resource region for a fast UL data transmission like an urgent message, and may correspond to the entire PUSCH region or a part of regions among the PUSCH region.

Third Embodiment

A third embodiment is a method for triggering a fast UL grant of an eNB by transmitting a fast UL grant request signaling to the eNB.

The fast UL grant request signaling may be performed by (1) adding a specific field in a MAC CE or (2) defining a new MAC CE.

(1) Definition of an identifier bit for requesting a fast UL grant in a MAC control element (CE)

By using a MAC CE having a reserved bit defined for the existing UL MAC data transmission, an identifier bit for requesting a fast UL grant may be defined.

Here, the identifier bit for requesting a fast UL grant may be called a fast UL grant request field (or bit), a fast UL grant request indicator, and the like.

The fast UL grant request field may have 1 bit length.

As an example, when the fast UL grant request field is set to '1', this may represent that a UE request an urgent resource.

Accordingly, an eNB that receives the fast UL grant request field set to '1' from a UE transmits a fast UL grant to the UE.

FIG. 27 is a diagram illustrating an example of a MAC CE including a fast UL grant request field proposed in the present disclosure.

That is, FIG. 27 shows an example that a fast UL grant request indicator is defined by using a reserved bit in a Power Headroom Report MAC Control Element (PHR MAC CE).

In FIG. 27, an FG field 2710 is a field indicating a Fast UL Grant request indicator.

The FG field may also be defined by other MAC CE including a reserved bit except the PHR MAC CE.

(2) Definition of a new MAC CE for requesting a fast UL grant

A new MAC CE for requesting a fast UL grant for an Uplink Shared Channel (UL-SCH) may be defined.

The MAC CE newly defined for the fast UL grant request may include size information of UL data intended to transmit quickly and/or a fast UL grant request indicator that means whether to request a fast UL grant.

In addition, a buffer size field that represents buffer size information included in the newly defined MAC CE may have a length of 1 to 8 bits.

In the case that a length of the buffer size field is 8 bits, the FG field may be omitted, and the MAC CE transmitting that has a buffer size field of 8 bits length may mean an urgent resource request.

Accordingly, an eNB that receives a newly defined MAC CE for the fast UL grant request allocates a UL resource with higher priority than other UE by using UL resource information for a buffer size requested to a UE that transmits the newly defined MAC CE.

FIG. 28 is a diagram illustrating an example of a newly defined MAC CE for a fast UL grant request proposed in the present disclosure.

As shown in FIG. 28, the newly defined MAC CE for a fast UL grant request includes an FG field 2810 and a buffer size field 2820.

The FG field is a field indicating whether to request a fast UL grant, and the buffer size field represents information in relation to a size of a fast UL data that a UE is intended to transmit.

Fourth Embodiment

A fourth embodiment is a method for triggering a fast UL grant of an eNB by signaling with a PRACH preamble index.

That is, the fourth embodiment represents a method for a UE to receive a fast UL grant from an eNB by transmitting a PRACH signaling that indicates a fast UL resource allocation request to an eNB by an urgent UE.

For the PRACH signaling, a specific preamble index set may be defined for an urgent UL resource request.

In this case, a UE may be allocated with a specific preamble index from an eNB (dedicated preamble index) for requesting a fast UL grant or may select a random value (random preamble index) and transmit it to the eNB.

Accordingly, the eNB that receives a preamble index included in the specific preamble index set from a UE through PRACH signaling may transmit a fast UL grant for the received preamble index to the UE.

Fifth Embodiment

A fifth embodiment represents a method for an eNB to transmit a fast UL index to a UE first.

That is, in the case that an eNB is needed to receive quickly a response to a specific DL data transmitted to a UE, the fifth embodiment represents a method for transmitting a fast UL grant to the UE.

Accordingly, in the case that an eNB transmits a specific DL data to a UE and identifies it is the service that should receive a response to the specific DL data quickly from the UE, the eNB transmit a fast UL grant to the UE.

For example, in the case of a specific service operating in an Acknowledge Mode (AM) and an eNB knows that the eNB should receive quickly a TCP ACK for DL data transmitted to a UE from the UE, the eNB transmits a fast UL grant for a fast TCP ACK transmission of a UE to the UE.

Except the first embodiment to the fifth embodiment described above, in the case that a fast retransmission is required for the DL data that an eNB transmitted to a UE, the eNB transmit a fast UL grant to the UE.

That is, in the case that a fast retransmission is required for the data that an eNB transmits to a UE previously, the eNB may transmit a fast UL grant to the UE.

A Method for Transceiving a Fast UL Grant

Next, a method for transceiving a fast UL grant will be described in detail.

Hereinafter, a method for an eNB to transmit a fast UL grant to a UE (general UE and/or urgent UE) is provided depending on various triggering conditions of a fast UL grant described above.

The fast UL grant transceiving method is referred to as a technique that an eNB allocates a UL resource to a UE that requires UL resource urgently faster than previously, and the corresponding UE transmits urgent data (urgent message, etc.) to an eNB quickly through the allocated UL resource.

More particularly, according to the fast UL grant transceiving method, the UL resource allocated to a general UE previously is withdrawn and an urgent UE may use the withdrawn UL resource, and accordingly, the urgent UE may transmit urgent data quickly.

The meaning of withdrawing a resource of a general UE means that (1) a general UE does not use the resource which is already allocated from an eNB or (2) an eNB allocates the resource allocated to a general UE(s) to urgent UEs.

The fast UL grant transceiving method may be divided into various methods according to whether a region that a general UE and/or an urgent UE receives a fast UL grant from an eNB is a common search space (CSS) of a PDCCH or a UE-specific search space (USS), or uses a mixed region (CSS and USS).

The various methods will be described in more detail through embodiments below.

In addition, the present disclosure newly defines a fast UL withdraw signaling additionally for a transceiving method of a fast UL grant.

The fast UL withdraw signaling may also be represented as a fast UL withdrawing field.

The fast UL withdraw signaling a signaling or a message for notifying that the UL resource allocated to a UE is a withdrawable resource.

Accordingly, a general UE that receives the fast UL withdraw signaling from an eNB may identify that a resource allocated in a UL grant received before 4 subframes (SFs) in a UL data transport SF may be withdrawable.

Therefore, a DCI format for the existing UL grant may include an identifier notifying that the UL resource allocated through the UL grant is a withdrawable resource for the purpose of urgent data transmission, and the like.

The identifier may be called a fast UL Withdraw Indication, a fast UL Withdraw Indicator, or the like. The identifier may be a flag of 1 bit size.

Accordingly, the UE that receives a UL grant together with the identifier from an eNB is not required to perform separately a blind decoding for receiving a fast UL grant or a fast UL withdraw signaling.

For example, in the case that the fast UL Withdraw Indication information is set to '1', this may indicate that it is excluded from a resource withdrawal target or an omission of DCI detection.

In addition, the fast UL Withdraw Indication information may set such that a UE may know it implicitly through a reception of preemption PUSCH resource information through system information (SI).

The preemption PUSCH resource region may be set identically with or smaller than the entire PUSCH resource region.

In addition, the resource (region) except the preemption PUSCH resource region may indicate the UL resource allocated to a UE may not be withdrawn.

As such, by defining a resource that may not be withdrawn, a UE may transmit data of a legacy UE or data of which priority is high without an influence of the preemption PUSCH resource without any change.

Accordingly, the UE allocated with a resource (resource which may not be withdrawn) in a region except the preemption PUSCH resource region is not required to perform a blind decoding for receiving a fast UL grant or a fast UL withdraw signaling.

In addition, only a fast UL grant is transmitted to the urgent UE when there is no resource which is already allocated to UEs on a time of allocating a resource to the urgent UE, and for the resource that is not occupied by any UEs, and accordingly, a fast UL grant may be defined such that the urgent UE is allocated with a UL resource quickly.

In this case, a fast UL withdraw signaling is not transmitted.

In this case, it may be preferable that an eNB transmit a fast UL grant to a UE through a USS region. More detailed description for it will be described through the second embodiment.

Hereinafter, various embodiments of a fast UL grant transceiving method will be described.

First Embodiment

A first embodiment represents a method for transceiving a fast UL grant through a common search space (CSS).

That is, the first embodiment represents a method for receiving a fast UL grant from an eNB by both of a general UE that is needed to withdraw a resource and an urgent UE that is intended to preempt a resource through a CSS.

When an eNB transmits a fast UL grant through a CSS, an urgent UE may identify a resource allocated to itself through the fast UL grant, and a general UE may identify that it is needed to withdraw the resource that was allocated through the fast UL grant.

The first embodiment defines a new DCI format for a fast UL grant as shown in FIG. 29.

FIG. 29 is a diagram illustrating an example of a newly defined DCI format for a fast UL grant proposed in the present disclosure.

Since a DCI format is needed to include information of a fixed length, a DCI format in relation to a specific fast UL grant includes an urgent UE ID 2910, a withdraw UE ID 2920 and resource information 2930 which is withdrawn or preempted, as shown in FIG. 29.

In the case that one or more withdrawn or preemption resource on a specific time, at least one fast UL grant may be transmitted in an SF.

That is, when an urgent UE receives a DCI format in relation to a fast UL grant in which its own ID is included from an eNB, the urgent UE preempts a UL resource by using a UL grant of the received DCI format.

In addition, when a general UE receives a DCI format in relation to a fast UL grant including resource information which was allocated or receives a DCI format in relation to a fast UL grant including its own ID, the general UE withdraws a UL resource by using a UL grant of the received DCI format.

Furthermore, a new RNTI (e.g., FG-RNTI) for a UE to perform a blind decoding of a fast UL grant may be defined.

That is, only a general UE that may withdraw a resource and an urgent UE that requests an urgent resource may receive a fast UL grant by using a newly defined RNTI (e.g., FG-RNTI).

Through this, unnecessary blind decoding for a fast UL grant of a UE (legacy UE or a general UE allocated with a resource that may not be withdrawn) in which a resource withdrawal is unavailable may be decreased.

Here, it is assumed that a preemption (PUSCH) resource region is preconfigured among entire PUSCH resources.

The preemption (PUSCH) resource region may be set identically with or smaller than the entire PUSCH resource region.

The resource (region) except the preemption PUSCH resource region may mean that the UL resource allocated to a UE may not be withdrawn.

Accordingly, a general UE may transmit data of a legacy UE or data of which priority is high through the corresponding resource (a resource of which withdrawal is unavailable) without an influence of the preemption resource without any change.

By referring to FIG. 29, the meaning of the urgent UE ID, the withdraw UE ID and the resource information will be described.

First, the urgent UE ID may be a value indicating (1) a UE identifier in a cell or (2) a UE identifier used in a fast UL grant request.

Here, the UE identifier in a cell may mean C-RNTI.

A UE in a connected state (connected UE) may use C-RNTI as the urgent UE ID.

In addition, the UE identifier used in a fast UL grant request may be a scheduling request (SR) logical index/physical index or a PRACH preamble index.

That is, when a UE transmits a fast UL grant request to an eNB using a PUCCH SR, the SR index allocated to the UE may be used as an urgent UE ID.

Alternatively, when a UE transmits a fast UL grant request to an eNB through a PRACH preamble, the PRACH preamble index transmitted to the eNB may be used as an urgent UE ID.

Next, the withdraw UE ID may be a UE identifier in a cell.

As an ID of a UE that is needed to withdraw a resource by a fast UL grant, C-RNTI corresponding to a UE identifier in a cell may be used.

Here, in the case that an identifier (withdraw UE ID) of a UE that is needed to withdraw a resource may be identified through resource information, the identifier may be omitted.

The resource information may include resource position information, HARQ, MCS, power information, and the like.

The resource position information may include an SF offset, an RB index, the number of RBs field.

The SF offset (field) may be defined as a value representing how many SFs are from the SF on which a fast UL grant is transmitted in a UL resource.

It may be preferable that the SF offset is indexed for SFs until a resource of a general UE is allocated.

For example, in the case of the LTE(-A) system, since a UL grant for a UL data transmission in $n+4^{th}$ SF is transmitted in $n^{th}$ SF, the SF offset may have a value of 0 to 2.

That is, in the case that a UL resource allocation is for a UL data transmission in $n+x^{th}$ SF, it is preferable that the SF offset has a value of 0 to x−2.

In the case that an allocated resource position is fixed depending on a fast UL grant for a specific system, the SF offset field may be omitted.

Next, the RB index represents a specific resource region of a specific SF.

In the case that the number of RBs for one urgent data is fixed, the RB index may mean a start or an end of RB index.

Here, the resource block (RB) may mean a Physical Resource Block or a Logical RB index which is newly indexed as a bundle of specific PRBs defined in a cell as a Logical RB.

Next, the number of RBs information means the number of allocated PRBs or LRBs (a bundle of PRBs in as a unit of Logical RB).

In the case that the number of PRBs or LRBs is fixed, the number of RBs information field may be omitted.

In addition, the HARQ, the MCS and the power information may be included in the resource information or omitted.

The DCI format for a fast UL grant defined in FIG. 29 is broadcasted through a CSS region as much as the number of UEs that require an urgent resource.

That is, the fast UL grant is information that all UEs should receive, and the UE that receives the fast UL grant performs the following operation according to a property of UE (general UE or urgent UE).

Operation of a General UE Allocated with UL Resource Already

In the case that there is a fast UL grant including information of a resource allocated with a general UE already among n fast UL grants received from an eNB, the general UE does not transmit UL data in the allocated resource, but returns the corresponding resource to a system.

In this case, the eNB may reallocate a new resource for the general UE that withdraw a resource.

Here, in the case that the general UE is reallocated with a resource from the eNB, the general UE transmits the UL data intended to transmit to the eNB by using the reallocated resource.

Alternatively, the general UE of which allocated resource is withdrawn without reallocation of a resource from the eNB may request an UL resource again to the eNB for a transmission of the UL data failed to transmit.

Operation of an Urgent UE that Requires an Urgent Resource

In the case that there is a fast UL grant including information of a resource allocated with an urgent UE already among n fast UL grants received from an eNB, the urgent UE transmits an urgent message in its own buffer or generated in advance through a physical resource region indicated by the fast UL grant.

FIG. 30 is a diagram illustrating an example of a method for withdrawing a resource of a general UE and preempting a resource of an urgent UE by a fast UL grant proposed in the present disclosure.

Detailed description for FIG. 30 is referred to the operation method of a general UE and an urgent UE described above.

In summary, the fast UL grant transceiving method in the first embodiment has a problem that an overhead of blind decoding of a UE occurs on the point that all of the general UEs that are not required to withdraw a resource should receive a fast UL grant.

However, according to the fast UL grant transceiving method in the first embodiment, the general UEs that should withdraw resource may receive the fast UL grant transmitted to a specific urgent UE(s) simultaneously, and accordingly, there is an effect of decreasing total overhead for signaling.

Second Embodiment

A second embodiment represents a method for transceiving a fast UL grant through a UE-specific search space (UCC).

That is, the second embodiment represents a method for transmitting a fast resource withdraw signaling (or fast UL withdraw signaling) transmitted to a general UE that should withdraw a resource and a fast resource allocation signaling (or fast UL grant signaling) that an urgent UE intended to preempt a resource through a UE-specific search space.

That is, a general UE that withdraws a resource and an urgent UE that should preempt a resource perform a blind decoding for a fast UL withdraw signaling or a fast UL grant signaling by using its own indicator (e.g., C-RNTI), respectively.

Here, the blind decoding of a UE may be interpreted as a monitoring of a UE.

Hereinafter, a method for designing a fast UL withdraw signaling and a fast UL grant signaling will be described.

(1) Method for designing a fast UL withdraw signaling including resource information to be withdrawn In the case of withdrawing a resource from a general UE and allocating the withdrawn resource to an urgent UE, an eNB transmits a signaling indicating to withdraw a resource to a UE allocated with a resource in advance.

That is, the second embodiment assumes that a fast UL withdraw signaling is transmitted through a USS region.

In this case, the fast UL withdraw signaling transmitted to a UE that is intended to withdraw a resource may be designed as two methods (method 1 and method 2) as below.

(Method 1) a Signaling Transmission Method Notifying Resource Information to be Withdrawn Among UL Resources Allocated to a UE Method 1 defines a new DCI format for a fast UL withdraw (or in relation to a fast UL withdraw) by using a fast UL withdraw signaling.

That is, in the case that a general UE receives a DCI format in relation to a fast UL withdraw from an eNB through a DL control channel, the general UE returns the resource corresponding to the received DCI format to a system.

The DCI format in relation to the fast UL withdraw may include resource information (RI) 3110 to be withdrawn and HARQ process ID 3120, as shown in FIG. 31.

FIG. 31 is a diagram illustrating an example of a new DCI format for a fast UL withdraw proposed in the present disclosure.

Accordingly, in the case that a general UE receives a fast UL withdraw signaling (or DCI format in relation to a fast UL withdraw) from an eNB, the general UE stops a UL data transmission in a resource to be withdrawn based on the resource information to be withdrawn and the HARQ process ID.

Here, the DCI format in relation to a fast UL withdraw may include both of the two types of information (the resource information to be withdrawn and the HARQ process ID) or may include either one of two types of information.

The resource information to be withdrawn may be identically interpreted as the resource information 2930 described in FIG. 29.

That is, the resource information to be withdrawn may include resource position information indicating a position of a resource to be withdrawn, HARQ, MCS, power information, and so on.

In addition, in the case that a general UE receives the DCI format in relation to a fast UL withdraw, the general UE may request a new resource allocation from the eNB.

Alternatively, as shown in FIG. 32, in the case that a synchronous HARQ process is performed, the general UE may be allocated with a UL grant newly on the time (N=6) when ACK/NACK of withdrawn resource (N=4) is transmitted.

Alternatively, the general UE may transmit UL data to the eNB by using a resource after 8 ms through an implicit resource allocation (i.e., without general UL grant in $8^{th}$ SF).

FIG. 32 is a diagram illustrating an example of a method for resource withdrawal and transmitting UL data of a general UE proposed in the present disclosure.

That is, FIG. 32 shows an example of the case that a fast UL grant and a fast UL withdraw signaling are transmitted in a SF (n–$2^{nd}$ SF) of two SFs ahead based on SF ($n^{th}$) to be withdrawn and preempted.

Referring to FIG. 32, an eNB transmits a general UL grant for $4^{th}$ SF (N=4) to a general UE (step, S3210).

Later, the eNB transmits a fast UL withdraw signaling to the general UE and transmits a fast UL grant signaling to an urgent UE according to the UL grant triggering condition described above (step, S3220).

In this case, the general UE returns the UL grant allocated in step S3210 to a system (step, S3230). That is, the general UE does not use the UL resource already allocated for an urgent message transmission of the urgent UE.

Accordingly, in the case that the urgent UE receives the fast UL grant, the general UE transmits urgent data by preempting the UL resource which is withdrawn by the general UE and through the corresponding resource (step, S3240).

Later, the eNB may transmit a general UL grant for $12^{th}$ SF (N=12) in an SF of N=8 so as to transmit the UL data that the general UE is intended to transmit in the next transmission time (N=12) (step, S3250).

In this case, the general UE may transmit the UL data intended to transmit in an SF of N=12 (step, S3260).

(Method 2) a Signaling Transmission Method Notifying Reallocation Resource Information In the case that a general UE receives a DCI format in relation to a fast UL withdraw from an eNB through a DL control channel, the general UE may transmit UL data, which is intended to transmit by using a resource already allocated, by using a newly received reallocation resource.

Method 2 is applicable when UL HARQ operates in asynchronous scheme.

In addition, method 2 is applicable to the case that a UL resource allocation (UL grant) may be allocated in a specific (or arbitrary) SF as well as n+$4^{th}$ SF.

As shown in FIG. 33, the information transmitted in resource withdrawal and reallocation signaling may include HARQ process ID information 3320 to be withdrawn and newly allocated resource information 3310.

The resource withdrawal and the reallocation signaling may be defined by a new DCI format for fast UL withdraw and reallocation.

That is, in the case that a general UE receives a fast UL withdraw signaling (a DCI format defined for fast UL withdraw and reallocation) transmitted to itself, the general UE may identify the resource to be withdrawn by using the HARQ process ID included in the fast UL withdraw signaling.

In addition, the general UE transmits the UL data for a corresponding HARQ PID by using newly allocated resource information, not the resource already allocated through the fast UL withdraw signaling.

Here, the newly allocated resource information may include an SF offset and resource information in the corresponding SF as described above.

The newly allocated resource information means a newly allocated resource, not the resource to be withdrawn.

In addition, the SF offset included in the newly allocated resource information may be omitted in the case that a UL data transport resource is fixed in n+4 as in the existing case.

FIG. 33 is a diagram illustrating another example of a new DCI format for a fast UL withdraw proposed in the present disclosure.

FIG. 34 illustrates an example of the case that a fast UL grant and a fast UL withdraw/regrant signaling are transmitted in $n-2^{nd}$ SF of a SF ($n^{th}$) to be withdrawn and preempted.

As shown in FIG. 34, in the case that a UL resource allocation is performed in asynchronous HARQ, an eNB allocates a new resource immediately for the UE that withdraws a resource.

Referring to FIG. 34, the eNB transmits a UL grant for HARQ process ID (PID) 0 and 1 to a general UE in an SF of N=0 (step, S3410).

In addition, the eNB transmits a UL grant of PID 2 to the general UE in an SF of N=1 (step, S3420).

According to the fast UL grant triggering condition described above, the eNB transmits a fast UL grant to an urgent UE in an SF of N=2 (step, S3430).

In this case, the eNB may transmit a fast UL regrant for reallocating a resource for PID 0 in step S3410 to the general UE in an SF of N=2 (step, S3430).

Later, the general UE does not transmit UL data for PID 0 allocated in step S3410 in an SF of N=4 (step, S3440).

The general UE transmits UL data for PID 0 in an SF of N=6 by using the reallocated resource in step S3430 for the UL data intended to transmit (step, S3450).

In addition, an urgent UE transmits urgent data in an SF of N=4 by using the resource withdrawn from the general UE (i.e., the UL resource allocated to the general UE in step S3410) (step, S3450).

(2) Method for Designing a Fast UL Grant Signaling Including Resource Information to be Preempted A UE that receives a DCI format in relation to a fast UL grant from an eNB through a DL control channel transmits urgent data by using a resource corresponding to the received DCI format.

The information transmitted in the fast UL grant signaling may include resource information (RI) 3510 to be preempted and a HARQ process ID 3530 therefor.

The fast UL grant signaling may be defined as a new DCI format for a fast UL grant.

In this case, a time position (SF number) of the resource information to be preempted may be defined in the resource information (RI), and may be omitted in the case that it is fixed in the SF after a fixed time from the time when the fast UL grant is transmitted.

In addition, a UE may preempt a resource for an initial transmission of urgent data, but may also preempt a resource for a retransmission.

For this, the DCI format in relation to a fast UL grant may include a new data indicator field 3520 and the HARQ process ID field 3530.

That is, when a UE receives a fast UL grant signaling transmitted to itself from an eNB, the UE may transmit an urgent message through the corresponding resource by using the resource information included in the fast UL grant signaling and the HARQ process ID.

FIG. 35 is a diagram illustrating an example of a new DCI format for a fast UL grant proposed in the present disclosure.

FIG. 36 is a diagram illustrating an example of a method of an initial transmission and a retransmission of UL data using a fast UL grant proposed in the present disclosure.

In summary, the second embodiment has an effect of minimizing decoding overhead of a UE by transmitting DL control information only that a specific UE requires.

However, in the second embodiment, since additional signaling information for a general UE allocated with a resource in advance to obtain resource withdraw information is needed to be transmitted, overall signaling overhead may be increased.

Third Embodiment

A third embodiment provides a method for transmitting a fast UL grant through a USS for an urgent UE(s), and transmitting a fast UL grant through a CSS for a general UE(s).

That is, the third embodiment provides a method for transmitting a fast UL allocation signaling (or fast UL grant) received by an urgent UE to preempt a resource through a UE-specific search space (USS), and transmitting a fast UL withdraw signaling transmitted to a general UE that is needed to withdraw a resource through a common search space (CSS).

That is, a general UE that withdraws an urgent resource may identify whether to withdraw the resource allocated to itself by using simple information (e.g., bitmap information), and an urgent UE(s) that is required to preempt a resource may preempt a resource by receiving a fast UL grant signaling by using its own identifier (e.g., C-RNTI).

Here, a new RNTI (e.g., FW-RNTI) may be configured for a UE that receives a fast UL withdraw through a CSS to perform a blind decoding of the fast UL withdraw.

In this case, only the UE available to withdraw a resource may receive a fast UL withdraw by using the corresponding RNTI, and accordingly, the overhead of a blind decoding of a UE unavailable to withdraw a resource (i.e., legacy UE or a general UE allocated with a resource which is not withdrawable) may be decreased.

For this, it is assumed that preemption (PUSCH) resource region is preconfigured among the entire PUSCH resources in the method proposed in the present disclosure.

That is, the preemption (PUSCH) resource region may be set identical to or smaller than the entire PUSCH resource region.

In addition, the resource except the preemption resource region may mean a resource that is not withdrawable in the case that the resource is allocated to a UE.

Through this, a general UE may transmit data of a legacy UE or data of which priority is high without an influence of the preemption resource without any change.

First, a method for an urgent UE(s) to receive a fast UL grant through a USS from an eNB will be described.

A method as the same as the method described in section (2) of the second embodiment of the fast UL grant transceiving method described above may be applied to the DCI format for a fast UL grant that an eNB transmits to an urgent UE through a USS region and the related procedure.

Next, a method for a general UE(s) to receive a fast UL withdraw from an eNB through a CSS will be described.

In the case that only the resource withdraw information for a general UE is transmitted through a common search space (CSS), an eNB may transmit a signaling notifying that an allocated resource is going to be withdrawn to a UE which is allocated with a specific resource of a specific SF or a resource of a specific SF.

The signaling notifying the resource withdrawal may be CRC masked with a specific RNTI.

The signaling notifying the resource withdrawal may correspond to information that all of the UEs allocated with a resource of a specific SF should receive.

That is, the fast UL withdraw signaling (or command) transmitted to general UEs through a CSS, a DCI format in relation to a fast UL withdraw including a withdraw UE ID and resource information may be transmitted as much as the number of UEs that are going to withdraw a resource.

However, in order to minimize the signaling overhead, the resource withdraw signaling through a CSS may be designed as three methods as below.

(Method 1) a New DCI Format Definition Including Resource Withdraw Information for a Physical Resource Index Method 1 defines a new DCI format indicating resource withdraw information for a UL resource PRB/PBG index as shown in FIGS. 37(a) and (b).

In FIG. 37, N may be identical to the number of PRBs according to system bandwidth information or a number subtracted by the number of PRBs for a PUCCH resource.

Alternatively, N may have a number identical to the number of PRBs for a withdrawable resource region.

That is, N may be a value indicating the number of entire UL BRBs or the number of entire PUSCH BRBs or the number of entire urgent PUSCH BRBs.

In addition, N may be identical to the number of RB groups (PBGs) defined in a system.

Here, the RB group means a bundle of PRBs, and may be defined through system information, and may be indexed in a unit of RBG.

Here, the resource withdraw indicator for a specific PRB/RBG index may have a length of 1 bit.

A UE that receives a fast UL withdraw for $n+x^{th}$ SF compares it with the PRB/RBG index for a resource allocated to the UE itself.

As a result of the comparison, in the case that a bit value for an index of the same resource (PRB or RBG) is set to, for example, '1', this may represent that the UE should return the corresponding resource to a system.

Here, the $n+x^{th}$ SF means the count of resources after $x^{th}$ SF, in the case that the SF on the time when the fast UL withdraw is transmitted is defined as $n^{th}$ SF.

Here, x value may be different depending on a system, and may be fixed as an integer value greater than 1.

Alternatively, as shown in FIG. 38, x value may be defined in the first field (resource withdraw SF offset; 3810) of a fast UL withdraw, may indicate the corresponding withdrawal SF whenever it is transmitted, and may have a length of 1 bit or greater depending on an offset range.

FIGS. 37 and 38 illustrate examples of a DCI format newly defined for a fast UL withdraw proposed in the present disclosure.

In addition, FIG. 39 is a diagram illustrating an example of a resource withdrawal procedure for a PRB index or a RBG index proposed in the present disclosure.

Referring to FIG. 39, in the case that an eNB transmits a fast UL withdraw to a general UE(s) in the second SF (N=2), a resource withdraw indicator for PRB/RBG index of $4^{th}$ SF (N=4) may be transmitted as much as the number (N) of PRB/RBG indexes.

As shown in FIG. 39, a resource withdraw indicator 3910 may be represented as a bitmap form, and the bit value corresponding to each PRB/RBG index may be set to '0' or '1'.

In the case that the bit value is '0', this may represent that a resource is not withdrawn, and in the case that the bit value is '1', this may represent that a resource is withdrawn.

That is, in the case that information for PRB/RBG index allocated to a UE is set to '1', this means that the UE should return the corresponding resource to a system.

Here, a UE that receives a fast UL withdraw signaling in which only a part of resources allocated to the UE is set to '1' may withdraw a resource only for the resource corresponding to the PRB/RBG index set to '1', and for the resource corresponding to the PRB/RBG index set to '0' (a resource that is not required to be withdrawn), the UE may transmit UL data using the corresponding resource.

In addition, in the case that a resource that is not required to be withdrawn has a value of a specific level (or threshold value) or smaller, the corresponding UE may withdraw all of the allocated resources.

(Method 2) a New DCI Format Definition Including Resource Withdraw Information for a Received UL Grant Method 2 defines a new DCI format indicating resource withdraw information for a UL grant allocated with a UL resource as shown in FIG. 40.

In the case that an eNB transmits a fast UL withdraw indicating a resource withdrawal for $n+x^{th}$ SF in $n^{th}$ SF, N in FIG. 40 becomes the number of UL grants transmitted in $n+x-4^{th}$ SF or the maximum number of UL grants that may be transmitted in a specific SF.

Here, $n+x-4^{th}$ is a value exemplified since a UL grant in the LTE(-A) system means a UL resource allocation for a UL transmission after $4^{th}$ SF.

The value of '4' in n+x-4 may be used as a different value according to a system or a TTI length.

That is, the corresponding value ('4') is determined depending on processing delay considering a data decoding time, an encoding time, a timing alignment value, and the like.

FIG. 40 is a diagram illustrating another example of a new DCI format for a fast UL withdraw proposed in the present disclosure.

In addition, method 2 proposes to additionally include an index field for a fast UL withdraw through the $n+x-4^{th}$ UL grant.

That is, an index field may be added in the current DCI format 0, and the corresponding index field may be set as a length that may represents the maximum number of UL grants that may be transmitted in a single SF.

In the case that an eNB allocates a UL resource for UL data in $n+4^{th}$ SF through a UL grant ($n^{th}$ SF), the eNB may allocate an index of the UL grant together.

Accordingly, in the case that the eNB requires a withdrawal in the corresponding resource, the eNB may notify that the resource allocated to a UE is going to be withdrawn by setting a fast UL withdraw indicator for the corresponding index to be '1'.

(Method 3) a New DCI Format Definition Including Resource Withdraw Information for a UE Method 3 defines a new DCI format indicating resource withdraw information for a UE index allocating a UL resource as shown in FIG. 41.

Here, N and the UE index for a UE may be transmitted to the corresponding UE through a higher layer (RRC) message, and the like.

FIG. 41 is a diagram illustrating another example of a new DCI format for a fast UL withdraw proposed in the present disclosure.

According to method 3, the resource withdraw information for all UEs that an eNB may transmit a resource to UL should be available to be transmitted in a specific SF.

In the case that a resource withdraw indicator for an index field allocated to a UE in advance through a UL layer message is set to '1', the UE returns a UL resource in the allocated $n+x^{th}$ SF to a system.

In summary, using the method proposed in the present disclosure described above, by detecting an urgent PUSCH resource position of an urgent UE quickly, an eNB may allocate a resource for an urgent message quickly without resource collision with another urgent UE or a general UE allocated with the corresponding resource in advance.

In addition, according to the method proposed in the present disclosure, a time as much as total (4 or 5)*N may be required from a fast UL grant request transmission of a UE to an urgent data transmission of an actual UE depending on TA between the UE and the eNB including a fast UL grant/withdraw reception of the UE.

This has an effect of bring a time decrease as much as 12*N or 13*N in comparison with the conventional method (time of 17*N is required) while providing the same reliability in comparison with the conventional method for transmitting UL data through an SR.

Here, N is time to interval (TTI) and means 1 ms for LTE(-A).

FIG. 42 illustrates the total required time for a UL data transmission through the conventional scheduling request (SR), and FIG. 43 is a diagram illustrating the total required time for a UL data transmission through the fast UL grant proposed in the present disclosure.

General Apparatus to which the Present Invention May be Applied

FIG. 44 illustrates a block diagram of a wireless communication apparatus to which the methods proposed in the present disclosure may be applied.

Referring to FIG. 44, the wireless communication system includes a base station (eNB) 4410 and a plurality of user equipments (UEs) 4420 located within the region of the eNB 4410.

The eNB 4410 includes a processor 4411, a memory 4412 and a radio frequency unit 4413. The processor 4411 implements the functions, processes, and/or methods proposed in FIGS. 1 to 41 above. The layers of wireless interface protocol may be implemented by the processor 4411. The memory 4412 is connected to the processor 4411, and stores various types of information for driving the processor 4411. The RF unit 4413 is connected to the processor 4411, and transmits and/or receives radio signals.

The UE 4420 includes a processor 4421, a memory 4422 and an RF unit 4423. The processor 4421 implements the functions, processes and/or methods proposed in FIGS. 1 to 41 above. The layers of wireless interface protocol may be implemented by the processor 4421. The memory 4422 is connected to the processor 4421, and stores various types of information for driving the processor 4421. The RF unit 4423 is connected to the processor 4421, and transmits and/or receives radio signals.

The memories 4412 and 4422 may be located interior or exterior of the processors 4411 and 4421, and may be connected to the processors 4411 and 4421 with well known means.

In addition, the eNB 4410 and/or the UE 4420 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for transmitting uplink data in a wireless communication system of the present invention has been described mainly with the example applied to 3GPP LTE/LTE-A system, but may also be applied to various wireless communication systems except the 3GPP LTE/LTE-A system.

The invention claimed is:

1. A method for transmitting, by a user equipment (UE), urgent data in a wireless communication system, the method comprising:
    transmitting, to a base station, a fast UL grant request requesting a uplink resource allocation for transmitting a urgent data;
    receiving, from the base station, a fast UL grant corresponding to the fast UL grant request; and
    transmitting, to the base station, the urgent data based on the fast UL grant;
    wherein the fast UL grant request is included in a medium access control information element (MAC CE) or is a specific preamble index transmitted on a physical random access channel (PRACH).

2. The method of claim 1, wherein the MAC CE further includes information for a size of the urgent data.

3. The method of claim 1, wherein the information for a size of the urgent data is represented as 1 bit to 8 bits.

4. The method of claim 1, wherein the fast UL grant is received in at least one of a common search space (CSS) or a UE-specific search space (USS).

5. The method of claim 4, when the fast UL grant is received in the common search space (CSS),
   wherein the fast UL grant is received on a first Downlink Control Information (DCI) format.

6. The method of claim 5, wherein the first DCI format includes at least one of a UE identifier for identifying the UE or a resource information (RI) field related to a preemption resource.

7. The method of claim 6, wherein the resource information field related to the preemption resource includes at least one of a subframe offset field representing how many subframes are from the subframe on which the fast UL grant is received, a resource block (RB) index field representing a resource block of the preemption resource or resource block (RB) number field representing a number of RBs allocated for the preemption resource.

8. The method of claim 4, when the fast UL grant is received in the UE-specific search space (USS),
   wherein the fast UL grant is received on a third Downlink Control Information (DCI) format, and
   wherein the second DCI format includes at least one of a resource information (RI) field related to a preempted resource, a hybrid automatic repeat request (HARQ) process identifier (ID) field related to the resource information field or a new data indicator (NDI) field for whether the UL resource allocated by the fast UL grant is for an initial transmission or a retransmission.

9. A user equipment (UE) for transmitting uplink (UL) data in a wireless communication system, comprising:
   a radio frequency (RF) module for transmitting and receiving a radio signal; and
   a processor functionally connected to the RF module,
   wherein the processor is configured to:
      transmit, to a base station, a fast UL grant request requesting a uplink resource allocation for transmitting urgent data;
      receive, from the base station, a fast UL grant corresponding to the fast UL grant request; and
      transmit, to the base station, the urgent data based on the fast UL grant;
      wherein the fast UL grant request is included in a medium access control information element (MAC CE) or is a specific preamble index transmitted on a physical random access channel (PRACH).

10. The UE of claim 9, wherein the MAC CE further includes information for a size of the urgent data.

* * * * *